(12) United States Patent
Dong et al.

(10) Patent No.: US 9,392,191 B2
(45) Date of Patent: Jul. 12, 2016

(54) METHOD AND DEVICE FOR PROCESSING VIDEO CONFERENCE

(71) Applicant: Huawei Technologies Co., Ltd., Shenzhen (CN)

(72) Inventors: Jianming Dong, Shenzhen (CN); Peng Ge, Shenzhen (CN); Chang Tang, Shenzhen (CN); Zhe Sun, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/335,238

(22) Filed: Jul. 18, 2014

(65) Prior Publication Data

US 2014/0327727 A1 Nov. 6, 2014

Related U.S. Application Data

(63) Continuation of application No. PCT/CN2013/074860, filed on Apr. 27, 2013.

(51) Int. Cl.
*H04N 7/14* (2006.01)
*H04N 5/265* (2006.01)
*H04N 7/15* (2006.01)

(52) U.S. Cl.
CPC ............... *H04N 5/265* (2013.01); *H04N 7/152* (2013.01)

(58) Field of Classification Search
None
See application file for complete search history.

(56) References Cited

U.S. PATENT DOCUMENTS

| 8,749,610 | B1 * | 6/2014 | Gossweiler | H04N 7/15 348/14.08 |
| 8,830,293 | B2 * | 9/2014 | Mauchly | H04N 7/147 348/14.07 |
| 2006/0029039 | A1 * | 2/2006 | Ramey | H04M 7/0012 370/352 |
| 2006/0098086 | A1 | 5/2006 | Chandra et al. | |
| 2009/0083639 | A1 * | 3/2009 | McKee Cooper | H04N 7/15 715/753 |

(Continued)

FOREIGN PATENT DOCUMENTS

| CN | 101610401 A | 12/2009 |
| CN | 101765827 A | 6/2010 |

(Continued)

OTHER PUBLICATIONS

Foreign Communication From a Counterpart Application, European Application No. 13866482.6, Extended European Search Report dated Jun. 22, 2015, 7 pages.

(Continued)

*Primary Examiner* — Maria El-Zoobi
(74) *Attorney, Agent, or Firm* — Conley Rose, P.C.; Grant Rodolph

(57) ABSTRACT

A method and a device for processing a video conference, including receiving, by a video conference server, first video information sent by a first video terminal and second video information sent by a second video terminal, acquiring, by the video conference server, a preset quantity of personal video information from the received second video information and first video information, and synthesizing the preset quantity of the personal video information to generate a synthesized video, and sending, by the video conference server, the synthesized video to a third video terminal to display. The method and device for processing a video conference avoid a poor display effect due to site disparity when the integrated video of the site is used as a basis, and provide flexibility for maximizing the information display efficiency.

14 Claims, 14 Drawing Sheets

A video conference server receives first video information sent by a first video terminal and second video information sent by a second video terminal, where the first video information includes personal video information of each attendee in a site where the first video terminal is located, and the second video information includes personal video information of each attendee in a site where the second video terminal is located — S10

The video conference server acquires a preset quantity of the personal video information from the received second video information and first video information, and synthesizes the preset quantity of the personal video information to generate a synthesized video, so that attendees separately corresponding to the preset quantity of the personal video information are in a consistent site background in the synthesized video — S20

The video conference server sends the synthesized video to a third video terminal to display — S30

(56) References Cited

U.S. PATENT DOCUMENTS

| | | |
|---|---|---|
| 2009/0147139 A1 | 6/2009 | Watanabe et al. |
| 2010/0171807 A1* | 7/2010 | Tysso ............... H04N 7/152 348/14.09 |
| 2011/0246669 A1 | 10/2011 | Kanada et al. |
| 2012/0011254 A1 | 1/2012 | Jamjoom et al. |
| 2012/0069131 A1* | 3/2012 | Abelow ............. G06Q 10/067 348/14.01 |
| 2012/0098919 A1* | 4/2012 | Tang .................. H04N 7/148 348/14.03 |
| 2012/0176934 A1 | 7/2012 | Farinacci et al. |
| 2012/0236106 A1* | 9/2012 | Wu ..................... H04M 3/567 348/14.07 |
| 2014/0085404 A1* | 3/2014 | Kleinsteiber ........ H04N 7/15 348/14.08 |

FOREIGN PATENT DOCUMENTS

| | | |
|---|---|---|
| CN | 101789232 A | 7/2010 |
| CN | 101808207 A | 8/2010 |
| CN | 102164091 A | 8/2011 |
| CN | 102209024 A | 10/2011 |
| EP | 1560434 A2 | 8/2005 |
| EP | 2509311 A1 | 10/2012 |
| GB | 2337654 A | 10/1998 |

OTHER PUBLICATIONS

Partial English Translation and Abstract of Chinese Patent Application No. CN101610401A, Sep. 17, 2014, 7 pages.

Foreign Communication From a Counterpart Application, PCT Application No. PCT/CN2012/085040, English Translation of International Search Report dated Feb. 28, 2013, 2 pages.

Foreign Communication From a Counterpart Application, PCT Application No. PCT/CN2012/085040, Written Opinion dated Feb. 28, 2013, 4 pages.

Foreign Communication From A Counterpart Application, European Application No. 13866482.6, European Office Action dated May 2, 2016, 7 pages.

* cited by examiner

| A third video terminal receives a synthesized video sent by a video conference server, where the synthesized video is acquired, by the video conference server, by synthesizing a preset quantity of personal video information acquired from first video information received from a first video terminal and second video information received from a second video terminal, where attendees separately corresponding to the preset quantity of the personal video information are in a consistent conference hall background in the synthesized video, the first video information includes personal video information of each attendee in a site where the first video terminal is located, and the second video information includes personal video information of each attendee in a site where the second video terminal is located | C10 |
|---|---|
| The third video terminal displays the synthesized video | C20 |

FIG. 8

```
┌─────────────────────────────────────────────────────────────┐
│ The third video terminal receives video information sent by at least one │
│ video collection apparatus, and packages the received video information │
│   to form third video information, where each of the at least one video │     C30
│ collection apparatus is configured to collect video information of at least │
│   one attendee in a site where the third video terminal is located, and the │
│   third video information includes personal video information of each of │
│      the at least one attendee in the site where the third video terminal is │
│                              located                         │
└─────────────────────────────────────────────────────────────┘
                                  ↓
┌─────────────────────────────────────────────────────────────┐
│    The third video terminal sends the third video information to the video │
│      conference server so that the video conference server generates, │
│   according to the third video information and the first video information, │  C31
│   a synthesized video and sends the synthesized video to the second video │
│     terminal, or generates, according to the third video information and the │
│   second video information, a synthesized video and sends the synthesized │
│                    video to the first video terminal          │
└─────────────────────────────────────────────────────────────┘
                                  ↓
┌─────────────────────────────────────────────────────────────┐
│   A third video terminal receives a synthesized video sent by a video │
│   conference server, where the synthesized video is acquired, by the video │
│    conference server, by synthesizing a preset quantity of personal video │
│   information acquired from first video information received from a first │
│     video terminal and second video information received from a second │   C10
│    video terminal, where attendees separately corresponding to the preset │
│        quantity of the personal video information are in a consistent site │
│              background in the synthesized video, the first video information │
│    includes personal video information of each attendee in a site where the │
│           first video terminal is located, and the second video information │
│    includes personal video information of each attendee in a site where the │
│                       second video terminal is located        │
└─────────────────────────────────────────────────────────────┘
                                  ↓
                                 TO
                               FIG. 9B

FIG. 9A
```

CONT.
FROM
FIG. 9A

| The third video terminal displays the synthesized video | C20 |

The third video terminal generates, according to switching instruction information entered by a user, a first attendee replacement instruction, where the first attendee replacement instruction carries a first attendee identifier and a second attendee identifier, and the first attendee replacement instruction is used to instruct to replace personal video information indicated by the first attendee identifier in the synthesized video with personal video information indicated by the second attendee identifier, where the personal video information indicated by the first attendee identifier is personal video information included in first video information except the first video information in the synthesized video, or personal video information included in second video information except the second video information in the synthesized video — C40

The third video terminal sends the first attendee replacement instruction to the video conference server, so that the video conference server replaces, according to the first attendee replacement instruction, the personal video information indicated by the first attendee identifier in the synthesized video with the personal video information indicated by the second attendee identifier — C50

The third video terminal receives the synthesized video, that is sent by the video conference server, with the personal video information replaced according to the first attendee replacement instruction, and displays the synthesized video — C60

FIG. 9B

A third video terminal receives a synthesized video sent by a video conference server, where the synthesized video is acquired, by the video conference server, by synthesizing a preset quantity of personal video information acquired from first video information received from a first video terminal and second video information received from a second video terminal, where attendees separately corresponding to the preset quantity of the personal video information are in a consistent site background in the synthesized video, the first video information includes personal video information of each attendee in a site where the first video terminal is located, and the second video information includes personal video information of each attendee in a site where the second video terminal is located ~ C10

↓

The third video terminal displays the synthesized video ~ C20

↓

The third video terminal generates, according to received delete instruction information input by a user, a delete instruction, where the delete instruction carries a fifth attendee identity, and the delete instruction is used to instruct to delete personal video information indicated by the fifth attendee from the personal video information included in the synthesized video, where the personal video information indicated by the fifth attendee identity is personal video information included in the synthesized video ~ C43

↓

The third video terminal sends the delete instruction to the video conference server, so that the video server deletes, according to the delete instruction, the personal video information indicated by the fifth attendee identity from the personal video information included in the synthesized video ~ C53

↓

The third video terminal receives the synthesized video, that is sent by the video conference server, with the personal video information deleted according to the delete instruction, and displays the synthesized video ~ C63

FIG. 12

METHOD AND DEVICE FOR PROCESSING VIDEO CONFERENCE

CROSS-REFERENCE TO RELATED APPLICATIONS

This application is a continuation of International Application No. PCT/CN2013/074860, filed on Apr. 27, 2013, which is hereby incorporated by reference in its entirety.

TECHNICAL FIELD

Embodiments of the present invention relate to communications technologies, and in particular, to a method and a device for processing a video conference.

BACKGROUND

With rapid development of network technologies, video conferencing has become the fastest-developing multimedia communication mode. Traditional business and administrative conferences have been transformed into video conferences. A video conference system separately transmits various types of data, such as static and dynamic images, voices, text, and pictures of an individual or a community in two or more different locations, by using existing various electrical communication transmission media, to a computer of each user, so that geographically-dispersed users may exchange information in various manners, such as images and voices, which may serve as a substitution for an onsite conference.

Typically, a camera and a display apparatus are placed in each site. The camera collects an image of a local site and the display apparatus displays images of both the local site and another site. Images are displayed on a per-site basis. Because display space of images for each site is limited and a quantity of attendees in each site is not determinate, it is difficult for a viewer to clearly see a speaker or an intended attendee. Moreover, when a quantity of sites is large, the effect of displaying images from all sites on the same display apparatus is poor.

SUMMARY

Embodiments of the present invention provide a method and a device for processing a video conference to avoid a poor display effect due to site disparity when an integrated video of a site is used as a basis, and to provide flexibility for maximizing the information display efficiency.

According to a first aspect, an embodiment of the present invention provides a method for processing a video conference, including receiving, by a video conference server, first video information sent by a first video terminal and second video information sent by a second video terminal, where the first video information includes personal video information of each attendee in a site where the first video terminal is located, and the second video information includes personal video information of each attendee in a site where the second video terminal is located, acquiring, by the video conference server, a preset quantity of the personal video information from the received second video information and first video information, and synthesizing the preset quantity of the personal video information to generate a synthesized video, so that attendees separately corresponding to the preset quantity of the personal video information are in a consistent site background in the synthesized video, and sending, by the video conference server, the synthesized video to a third video terminal to display.

In a first possible implementation manner, after the sending, by the video conference server, the synthesized video to a third video terminal to display, the method further includes receiving, by the video conference server, a first attendee replacement instruction sent by the first video terminal, the second video terminal, or the third video terminal, where the first attendee replacement instruction carries a first attendee identifier and a second attendee identifier, and the first attendee replacement instruction is used to instruct to replace personal video information indicated by the first attendee identifier in the synthesized video with personal video information indicated by the second attendee identifier, where the personal video information indicated by the first attendee identifier is the personal video information included in the synthesized video, and the personal video information indicated by the second attendee identifier is personal video information included in first video information except the first video information in the synthesized video, or personal video information included in second video information except the second video information in the synthesized video, replacing, by the video conference server according to the first attendee replacement instruction, the personal video information indicated by the first attendee identifier in the synthesized video with the personal video information indicated by the second attendee identifier, and sending, by the video conference server, the synthesized video with the replaced personal video information to the third video terminal to display.

In a second possible implementation manner, after the sending, by the video conference server, the synthesized video to a third video terminal to display, the method further includes receiving, by the video conference server, a second attendee replacement instruction sent by the first video terminal, the second video terminal, or the third video terminal, where the second attendee replacement instruction carries a third attendee identifier, and the second attendee replacement instruction is used to instruct to replace the personal video information included in the synthesized video with personal video information indicated by the third attendee identifier, where the personal video information indicated by the third attendee identifier is personal video information included in first video information except the first video information in the synthesized video, or personal video information included in second video information except the second video information in the synthesized video, selecting, by the video conference server according to the second attendee replacement instruction, target personal video information from the personal video information included in the synthesized video, and replacing the selected target personal video information with the personal video information indicated by the third attendee identifier, and sending, by the video conference server, the synthesized video with the replaced personal video information to the third video terminal to display.

With reference to the second implementation manner of the first aspect, in a third possible implementation manner, the second attendee replacement instruction carries location information, and the selecting, by the video conference server according to the second attendee replacement instruction, target personal video information from the personal video information included in the synthesized video includes using, by the video conference server according to the second attendee replacement instruction, the personal video information that corresponds to the location information included in the second attendee replacement instruction and is included in the synthesized video as the target personal video information.

In a fourth possible implementation manner, after the sending, by the video conference server, the synthesized video to a third video terminal to display, the method further includes receiving, by the video conference server, an add instruction from the first video terminal, the second video terminal, or the third video terminal, where the add instruction carries a fourth attendee identifier, and the add instruction is used to instruct to add personal video information indicated by the fourth attendee identifier to the synthesized video, where the personal video information indicated by the fourth attendee identifier is personal video information included in first video information except the first video information in the synthesized video, or personal video information included in second video information except the second video information in the synthesized video, adding, by the video server according to the add instruction, the personal video information indicated by the fourth attendee identifier to the synthesized video, and sending, by the video conference server, the synthesized video with the added personal video information to the third video terminal to display.

In a fifth possible implementation manner, after the sending, by the video conference server, the synthesized video to a third video terminal to display, the method further includes receiving, by the video conference server, a delete instruction sent by the first video terminal, the second video terminal, or the third video terminal, where the delete instruction carries a fifth attendee identifier, and the delete instruction is used to instruct to delete personal video information indicated by the fifth attendee identifier from the synthesized video, where the personal video information indicated by the fifth attendee identifier is the personal video information included in the synthesized video, deleting, by the video server according to the delete instruction, the personal video information indicated by the fifth attendee identifier from the personal video information included in the synthesized video, and sending, by the video conference server, the synthesized video with the deleted personal video information to the third video terminal to display.

With reference to the first aspect or any one of the first to the fifth possible implementation manners according to the first aspect, in a sixth possible implementation manner, the synthesizing, by the video conference server, the preset quantity of the personal video information to generate a synthesized video includes splicing, by the video conference server, corresponding images in the preset quantity of the personal video information to generate a synthesized image, where the corresponding images in the preset quantity of the personal video information are synchronous in time sequence, and combining a plurality of the synthesized images to generate a synthesized video.

With reference to the first aspect or any one of the first to the fifth possible implementation manners according to the first aspect, in a seventh possible implementation manner, the synthesizing, by the video conference server, the preset quantity of the personal video information to generate a synthesized video includes arranging, by the video conference server, image information extracted from the preset quantity of the personal video information in a preset background image to generate a synthesized image, where the image information included in the preset quantity of the personal video information acquired from the first video information and the second video information is synchronous in time sequence, and combining a plurality of the synthesized images to generate a synthesized video.

According to a second aspect, an embodiment of the present invention provides a method for processing a video conference, including receiving, by a third video terminal, a synthesized video sent by a video conference server, where the synthesized video is acquired, by the video conference server, by synthesizing a preset quantity of personal video information acquired from first video information received from a first video terminal and second video information received from a second video terminal, where attendees separately corresponding to the preset quantity of the personal video information are in a consistent site background in the synthesized video, the first video information includes personal video information of each attendee in a site where the first video terminal is located, and the second video information includes personal video information of each attendee in a site where the second video terminal is located, and displaying, by the third video terminal, the synthesized video.

In a first possible implementation manner, the method further includes receiving, by the third video terminal, video information sent by at least one video collection apparatus, and packaging the received video information to form third video information, where each of the at least one video collection apparatus is configured to collect video information of at least one attendee in a site where the third video terminal is located, and the third video information includes personal video information of each of the at least one attendee in the site where the third video terminal is located, and sending, by the third video terminal, the third video information to the video conference server so that the video conference server generates, according to the third video information and the first video information, a synthesized video and sends the synthesized video to the second video terminal, or generates, according to the third video information and the second video information, a synthesized video and sends the synthesized video to the first video terminal.

In a second possible implementation manner, after the displaying, by the third video terminal, the synthesized video, the method further includes generating, by the third video terminal according to switching instruction information entered by a user, a first attendee replacement instruction, where the first attendee replacement instruction carries a first attendee identifier and a second attendee identifier, and the first attendee replacement instruction is used to instruct to replace personal video information indicated by the first attendee identifier in the synthesized video with personal video information indicated by the second attendee identifier, where the personal video information indicated by the first attendee identifier is the personal video information included in the synthesized video, and the personal video information indicated by the second attendee identifier is personal video information included in first video information except the first video information in the synthesized video, or personal video information included in second video information except the second video information in the synthesized video, sending, by the third video terminal, the first attendee replacement instruction to the video conference server, so that the video conference server replaces, according to the first attendee replacement instruction, the personal video information indicated by the first attendee identifier in the synthesized video with the personal video information indicated by the second attendee identifier, and receiving, by the third video terminal, the synthesized video, that is sent by the video conference server, with the replaced personal video information according to the first attendee replacement instruction, and displaying the synthesized video.

In a third possible implementation manner, after the displaying, by the third video terminal, the synthesized video, the method further includes determining, by the third video terminal, a third attendee identifier indicating an attendee who is currently speaking when detecting that a voice collection apparatus in a site where the third video terminal is located has voice input within a preset time range, generating, by the third video terminal, a second attendee replacement instruction that carries the third attendee identifier, where the second attendee replacement instruction is used to instruct to replace the personal video information included in the synthesized video sent to the first video terminal or the second video terminal with personal video information indicated by the third attendee identifier, and sending, by the third video terminal, the second attendee replacement instruction to the video conference server, so that the video conference server selects, according to the second attendee replacement instruction, target personal video information from the personal video information included in the synthesized video sent to the first video terminal or the second video terminal, and replaces the target personal video information with the personal video information indicated by the third attendee identifier.

In a fourth possible implementation manner, after the displaying, by the third video terminal, the synthesized video, the method further includes generating, by the third video terminal according to received add instruction information entered by a user, an add instruction, where the add instruction carries a fourth attendee identifier, and the add instruction is used to instruct to add personal video information indicated by the fourth attendee identifier to the synthesized video, where the personal video information indicated by the fourth attendee identifier is personal video information included in first video information except the first video information in the synthesized video, or personal video information included in second video information except the second video information in the synthesized video, sending, by the third video terminal, the add instruction to the video conference server, so that the video server adds, according to the add instruction, the personal video information indicated by the fourth attendee identifier to the synthesized video, and receiving, by the third video terminal, the synthesized video, that is sent by the video conference server, with the personal video information added according to the add instruction, and displaying the synthesized video.

In a fifth possible implementation manner, after the displaying, by the third video terminal, the synthesized video, the method further includes generating, by the third video terminal according to received delete instruction information entered by a user, a delete instruction, where the delete instruction carries a fifth attendee identifier, and the delete instruction is used to instruct to delete personal video information indicated by the fifth attendee from the personal video information included in the synthesized video, where the personal video information indicated by the fifth attendee identifier is the personal video information included in the synthesized video, sending, by the third video terminal, the delete instruction to the video conference server, so that the video server deletes, according to the delete instruction, the personal video information indicated by the fifth attendee identifier from the personal video information included in the synthesized video, and receiving, by the third video terminal, the synthesized video, that is sent by the video conference server, with the personal video information deleted according to the delete instruction, and displaying the synthesized video.

According to a third aspect, an embodiment of the present invention provides a video conference server, including a receiving unit configured to receive first video information sent by a first video terminal and second video information sent by a second video terminal, where the first video information includes personal video information of each attendee in a site where the first video terminal is located, and the second video information includes personal video information of each attendee in a site where the second video terminal is located, a processing unit, connected to the receiving unit, and configured to acquire a preset quantity of the personal video information from the received second video information and first video information, and synthesize the preset quantity of the personal video information to generate a synthesized video, so that attendees separately corresponding to the preset quantity of the personal video information are in a consistent site background in the synthesized video, and a sending unit, connected to the processing unit, and configured to send the synthesized video to a third video terminal to display.

In a first possible implementation manner, the receiving unit is further configured to receive a first attendee replacement instruction sent by the first video terminal, the second video terminal, or the third video terminal, where the first attendee replacement instruction carries a first attendee identifier and a second attendee identifier, and the first attendee replacement instruction is used to instruct to replace personal video information indicated by the first attendee identifier in the synthesized video with personal video information indicated by the second attendee identifier, where the personal video information indicated by the first attendee identifier is the personal video information included in the synthesized video, the personal video information indicated by the second attendee identifier is personal video information included in first video information except the first video information in the synthesized video, or personal video information included in second video information except the second video information in the synthesized video, the processing unit is further configured to replace, according to the first attendee replacement instruction, the personal video information indicated by the first attendee identifier in the synthesized video with the personal video information indicated by the second attendee identifier, and the sending unit is further configured to send the synthesized video with the replaced personal video information to the third video terminal to display.

In a second possible implementation manner, the receiving unit is further configured to receive a first attendee replacement instruction sent by the first video terminal, the second video terminal, or the third video terminal, where the second attendee replacement instruction carries a third attendee identifier, and the second attendee replacement instruction is used to instruct to replace the personal video information included in the synthesized video with personal video information indicated by the third attendee identifier, where the personal video information indicated by the third attendee identifier is personal video information included in first video information except the first video information in the synthesized video, or personal video information included in second video information except the second video information in the synthesized video, the processing unit is further configured to select, according to the second attendee replacement instruction, target personal video information from the personal video information included in the synthesized video, and replace the selected target personal video information with the personal video information indicated by the third attendee identifier, and the sending unit is further configured to send the synthesized video with the replaced personal video information to the third video terminal to display.

With reference to the second implementation manner of the third aspect, in a third possible implementation manner, the second attendee replacement instruction further carries location information, and the processing unit is further configured to use, according to the second attendee replacement instruction, the personal video information that corresponds to the location information included in the second attendee replacement instruction and is included in the synthesized video as the target personal video information.

In a fourth possible implementation manner, the receiving unit is further configured to receive an add instruction from the first video terminal, the second video terminal, or the third video terminal, where the add instruction carries a fourth attendee identifier, and the add instruction is used to instruct to add personal video information indicated by the fourth attendee identifier to the synthesized video, where the personal video information indicated by the fourth attendee identifier is personal video information included in first video information except the first video information in the synthesized video, or personal video information included in second video information except the second video information in the synthesized video, the processing unit is further configured to add, according to the add instruction, the personal video information indicated by the fourth attendee identifier to the synthesized video, and the sending unit is further configured to send the synthesized video with the added personal video information to the third video terminal to display.

In a fifth possible implementation manner, the receiving unit is further configured to receive a delete instruction sent by the first video terminal, the second video terminal, or the third video terminal, where the delete instruction carries a fifth attendee identifier, and the delete instruction is used to instruct to delete personal video information indicated by the fifth attendee identifier from the synthesized video, where the personal video information indicated by the fifth attendee identifier is the personal video information included in the synthesized video, the processing unit is further configured to delete, according to the delete instruction, the personal video information indicated by the fifth attendee identifier from the personal video information included in the synthesized video, and the sending unit is further configured to send the synthesized video with the deleted personal video information to the third video terminal to display.

With reference to the third aspect or any one of the first to the fifth possible implementation manners of the third aspect, in a sixth possible implementation manner, the processing unit is further configured to splice corresponding images in the preset quantity of the personal video information to generate a synthesized image, where the corresponding images in the preset quantity of the personal video information are synchronous in time sequence, and combine a plurality of the synthesized images to generate a synthesized video.

With reference to the third aspect or any one of the first to the fifth possible implementation manners of the third aspect, in a seventh possible implementation manner, the processing unit is further configured to arrange image information included in the preset quantity of the personal video information in a preset background image to generate a synthesized image, where the image information included in the preset quantity of the personal video information acquired from the first video information and the second video information is synchronous in time sequence, and combine a plurality of the synthesized images to generate a synthesized video.

According to a fourth aspect, an embodiment of the present invention provides a third video terminal, including a receiving unit configured to receive a synthesized video sent by a video conference server, where the synthesized video is acquired, by the video conference server, by synthesizing a preset quantity of personal video information acquired from first video information received from a first video terminal and second video information received from a second video terminal, where attendees separately corresponding to the preset quantity of the personal video information are in a consistent site background in the synthesized video, the first video information includes personal video information of each attendee in a site where the first video terminal is located, and the second video information includes personal video information of each attendee in a site where the second video terminal is located, and a displaying unit, connected to the receiving unit, and configured to display the synthesized video.

In a first possible implementation manner, the receiving unit is further configured to receive video information sent by at least one video collection apparatus, and the third video terminal further includes a first processing unit, connected to the receiving unit, and configured to package received video information as third video information, where each of the at least one video collection apparatus is configured to collect video information of at least one attendee in a site where the third video terminal is located, and the third video information includes personal video information of each of the at least one attendee in the site where the third video terminal is located, and a first sending unit, connected to the first processing unit, and configured to send the third video information to the video conference server, so that the video conference server generates, according to the third video information and the first video information, a synthesized video and sends the synthesized video to the second video terminal, or generates, according to the third video information and the second video information, a synthesized video and sends the synthesized video to the first video terminal.

In a second possible implementation manner, the third video terminal further includes a second processing unit configured to generate, according to switching instruction information entered by a user, a first attendee replacement instruction, where the first attendee replacement instruction carries a first attendee identifier and a second attendee identifier, and the first attendee replacement instruction is used to instruct to replace personal video information indicated by the first attendee identifier in the synthesized video with personal video information indicated by the second attendee identifier, where the personal video information indicated by the first attendee identifier is the personal video information included in the synthesized video, the personal video information indicated by the second attendee identifier is personal video information included in first video information except the first video information in the synthesized video, or personal video information included in second video information except the second video information in the synthesized video, and a second sending unit, connected to the second processing unit, and configured to send the first attendee replacement instruction to the video conference server, so that the video conference server replaces, according to the first attendee replacement instruction, the personal video information indicated by the first attendee identifier in the synthesized video with the personal video information indicated by the second attendee identifier, and the receiving unit is further configured to receive the synthesized video, that is sent by the video conference server, with the replaced personal video information according to the first attendee replacement instruction, and display the synthesized video using the display unit.

In a third possible implementation manner, the third video terminal further includes a third processing unit configured to determine a third attendee identifier indicating an attendee who is currently speaking when detecting that a voice collection apparatus in a site where the third video terminal is located has voice input within a preset time range, and generate a second attendee replacement instruction that carries the third attendee identifier, where the second attendee replacement instruction is used to instruct to replace the personal video information included in the synthesized video sent to the first video terminal or the second video terminal with personal video information indicated by the third attendee identifier, and a third sending unit, connected to the third processing unit, and configured to send the second attendee replacement instruction to the video conference server, so that the video conference server selects, according to the second attendee replacement instruction, target personal video information from the personal video information included in the synthesized video sent to the first video terminal or the second video terminal, and replace the target personal video information with the personal video information indicated by the third attendee identifier.

In a fourth possible implementation manner, the third video terminal further includes a fourth processing unit configured to generate, according to received add instruction information entered by a user, an add instruction, where the add instruction carries a fourth attendee identifier, and the add instruction is used to instruct to add personal video information indicated by the fourth attendee identifier to the synthesized video, where the personal video information indicated by the fourth attendee identifier is personal video information included in first video information except the first video information in the synthesized video, or personal video information included in second video information except the second video information in the synthesized video, and a fourth sending unit, connected to the fourth processing unit, and configured to send the add instruction to the video conference server, so that the video server adds, according to the add instruction, the personal video information indicated by the fourth attendee identifier to the synthesized video, and the receiving unit is further configured to receive the synthesized video, that is sent by the video conference server, with the personal video information added according to the add instruction, and display the synthesized video using the display unit.

In a fifth possible implementation manner, the third video terminal further includes a fifth processing unit configured to generate, according to received delete instruction information entered by a user, a delete instruction, where the delete instruction carries a fifth attendee identifier, and the delete instruction is used to instruct to delete personal video information indicated by the fifth attendee from the personal video information included in the synthesized video, where the personal video information indicated by the fifth attendee identifier is the personal video information included in the synthesized video, and a fifth sending unit, connected to the fifth processing unit, and configured to send the delete instruction to the video conference server, so that the video server deletes, according to the delete instruction, the personal video information indicated by the fifth attendee identifier from the personal video information included in the synthesized video, and the receiving unit is further configured to receive the synthesized video, that is sent by the video conference server, with the personal video information deleted according to the delete instruction, and display the synthesized video using the display unit.

According to a fifth aspect, an embodiment of the present invention provides a video conference server, including a processor, a communications interface, a memory, and a bus.

The processor, the communications interface, and the memory are interconnected using the bus.

The communications interface is configured to receive first video information sent by a first video terminal and second video information sent by a second video terminal, where the first video information includes personal video information of each attendee in a site where the first video terminal is located, and the second video information includes personal video information of each attendee in a site where the second video terminal is located.

The memory is configured to store an instruction or data.

The processor is configured to call an instruction stored in the memory to receive a preset quantity of the personal video information from the received second video information and first video information, and synthesize the preset quantity of the personal video information to generate a synthesized video, so that attendees separately corresponding to the preset quantity of the personal video information are in a consistent site background in the synthesized video.

The communications interface is further configured to send the synthesized video to a third video terminal to display.

In a first possible implementation manner, the communications interface is further configured to receive a first attendee replacement instruction sent by the first video terminal, the second video terminal, or the third video terminal, where the first attendee replacement instruction carries a first attendee identifier and a second attendee identifier, and the first attendee replacement instruction is used to instruct to replace personal video information indicated by the first attendee identifier in the synthesized video with personal video information indicated by the second attendee identifier, where the personal video information indicated by the first attendee identifier is the personal video information included in the synthesized video, the personal video information indicated by the second attendee identifier is personal video information included in first video information except the first video information in the synthesized video, or personal video information included in second video information except the second video information in the synthesized video, the processor is further configured to call an instruction and data in the memory, to replace, according to the first attendee replacement instruction, the personal video information indicated by the first attendee identifier in the synthesized video with the personal video information indicated by the second attendee identifier, and the communications interface is further configured to send the synthesized video with the replaced personal video information to the third video terminal to display.

In a second possible implementation manner, the communications interface is further configured to receive a first attendee replacement instruction sent by the first video terminal, the second video terminal, or the third video terminal, where the second attendee replacement instruction carries a third attendee identifier, and the second attendee replacement instruction is used to instruct to replace the personal video information included in the synthesized video with personal video information indicated by the third attendee identifier, where the personal video information indicated by the third attendee identifier is personal video information included in first video information except the first video information in the synthesized video, or personal video information included in second video information except the second video information in the synthesized video, the processor is further configured to call an instruction and data in the memory, to select, according to the second attendee replacement instruction, target personal video information from the personal video information included in the synthesized video, and replace the selected target personal video information with the personal video information indicated by the third attendee identifier, and the communications interface is further configured to send the synthesized video with the replaced personal video information to the third video terminal to display.

With reference to the second implementation manner of the fifth aspect, in a third possible implementation manner, the second attendee replacement instruction further carries location information, and the processor is further configured to call an instruction and data in the memory, to use, according to the second attendee replacement instruction, the personal video information that corresponds to the location information included in the second attendee replacement instruction and is included in the synthesized video as the target personal video information.

In a fourth possible implementation manner, the communications interface is further configured to receive an add instruction from the first video terminal, the second video terminal, or the third video terminal, where the add instruction carries a fourth attendee identifier, and the add instruction is used to instruct to add personal video information indicated by the fourth attendee identifier to the synthesized video, where the personal video information indicated by the fourth attendee identifier is personal video information included in first video information except the first video information in the synthesized video, or personal video information included in second video information except the second video information in the synthesized video, the processor is further configured to call an instruction and data in the memory, to add, according to the add instruction, the personal video information indicated by the fourth attendee identifier to the synthesized video, and the communications interface is further configured to send the synthesized video with the added personal video information to the third video terminal to display.

In a fifth possible implementation manner, the communications interface is further configured to receive a delete instruction sent by the first video terminal, the second video terminal, or the third video terminal, where the delete instruction carries a fifth attendee identifier, and the delete instruction is used to instruct to delete personal video information indicated by the fifth attendee identifier from the synthesized video, where the personal video information indicated by the fifth attendee identifier is the personal video information included in the synthesized video, the processor is further configured to call an instruction and data in the memory, to delete, according to the delete instruction, the personal video information indicated by the fifth attendee identifier from the personal video information included in the synthesized video, and the communications interface is further configured to send the synthesized video with the deleted personal video information to the third video terminal to display.

With reference to the fifth aspect or any one of the first to the fifth possible implementation manners of the fifth aspect, in a sixth possible implementation manner, the processor is further configured to splice corresponding images in the preset quantity of the personal video information to generate a synthesized image, where the corresponding images in the preset quantity of the personal video information are synchronous in time sequence, and combine a plurality of the synthesized images to generate a synthesized video.

With reference to the fifth aspect or any one of the first to the fifth possible implementation manners of the fifth aspect, in a seventh possible implementation manner, the processor is further configured to arrange image information included in the preset quantity of the personal video information in a preset background image to generate a synthesized image, where the image information included in the preset quantity of the personal video information acquired from the first video information and the second video information is synchronous in time sequence, and combine a plurality of the synthesized images to generate a synthesized video.

According to a sixth aspect, an embodiment of the present invention provides a third video terminal, including a processor, a communications interface, a memory, a bus, and a display.

The processor, the communications interface, the memory, and the display are interconnected using the bus.

The communications interface is configured to receive a synthesized video sent by a video conference server, where the synthesized video is acquired, by the video conference server, by synthesizing a preset quantity of personal video information acquired from the first video information received from the first video terminal and the second video information received from the second video terminal, where attendees separately corresponding to the preset quantity of the personal video information are in a consistent site background in the synthesized video, the first video information includes personal video information of each attendee in a site where the first video terminal is located, and the second video information includes personal video information of each attendee in a site where the second video terminal is located.

The memory is configured to store an instruction or data.

The processor is configured to call an instruction in the memory to display the synthesized video on the display.

In a first possible implementation manner, the communications interface is further configured to receive video information sent by at least one video collection apparatus, the processor is further configured to package received video information as third video information, where each of the at least one video collection apparatus is used to collect video information of at least one attendee in a site where the third video terminal is located, and the third video information includes personal video information of each of the at least one attendee in the site where the third video terminal is located, and the communications interface is further configured to send the third video information to the video conference server, so that the video conference server generates, according to the third video information and the first video information, a synthesized video and sends the synthesized video to the second video terminal, or generates, according to the third video information and the second video information, a synthesized video and sends the synthesized video to the first video terminal.

In a second possible implementation manner, the processor is further configured to call an instruction and data in the memory, to generate, according to switching instruction information entered by a user, a first attendee replacement instruction, where the first attendee replacement instruction carries a first attendee identifier and a second attendee identifier, and the first attendee replacement instruction is used to instruct to replace personal video information indicated by the first attendee identifier in the synthesized video with personal video information indicated by the second attendee identifier, where the personal video information indicated by the first attendee identifier is the personal video information included in the synthesized video, the personal video information indicated by the second attendee identifier is personal video information included in first video information except the first video information in the synthesized video, or personal video information included in second video information except the second video information in the synthesized video, and the communications interface is further configured to send the first attendee replacement instruction to the video conference server, so that the video conference server replaces, according to the first attendee replacement instruction, the personal video information indicated by the first attendee identifier in the synthesized video with the personal video information indicated by the second attendee identifier, and receive the synthesized video, that is sent by the video conference server, with the replaced personal video information according to the first attendee replacement instruction, and display the synthesized video on the display.

In a third possible implementation manner, the processor is further configured to determine a third attendee identifier indicating an attendee who is currently speaking when detecting that a voice collection apparatus in a site where the third video terminal is located has voice input within a preset time range, and generate a second attendee replacement instruction that carries the third attendee identifier, where the second attendee replacement instruction is used to instruct to replace the personal video information included in the synthesized video sent to the first video terminal or the second video terminal with personal video information indicated by the third attendee identifier, and the communications interface is further configured to send the second attendee replacement instruction to the video conference server, so that the video conference server selects, according to the second attendee replacement instruction, target personal video information from the personal video information included in the synthesized video sent to the first video terminal or the second video terminal, and replaces the target personal video information with the personal video information indicated by the third attendee identifier.

In a fourth possible implementation manner, the processor is further configured to call an instruction and data in the memory, to generate, according to the received add instruction information entered by a user, an add instruction, where the add instruction carries a fourth attendee identifier, and the add instruction is used to instruct to add personal video information indicated by the fourth attendee identifier to the synthesized video, where the personal video information indicated by the fourth attendee identifier is personal video information included in first video information except the first video information in the synthesized video, or personal video information included in second video information except the second video information in the synthesized video, and the communications interface is further configured to send the add instruction to the video conference server, so that the video server adds, according to the add instruction, the personal video information indicated by the fourth attendee identifier to the synthesized video, and receive the synthesized video, that is sent by the video conference server, with the personal video information added according to the add instruction, and display the synthesized video on the display.

In a fifth possible implementation manner, the processor is further configured to call an instruction and data in the memory, to generate, according to the received deletion instruction information entered by a user, a delete instruction, where the delete instruction carries a fifth attendee identifier, and the delete instruction is used to instruct to delete personal video information indicated by the fifth attendee from the personal video information included in the synthesized video, where the personal video information indicated by the fifth attendee identifier is the personal video information included in the synthesized video, and the communications interface is further configured to send the delete instruction to the video conference server, so that the video server deletes, according to the delete instruction, the personal video information indicated by the fifth attendee identifier from the personal video information included in the synthesized video, and receive the synthesized video, that is sent by the video conference server, with the personal video information deleted according to the delete instruction, and display the synthesized video on the display.

It can be learned from the foregoing technical solutions, the embodiments of the present invention provide a method and a device for processing a video conference. A video conference server receives first video information sent by a first video terminal and second video information sent by a second video terminal, where the first video information includes personal video information of each attendee in a site where the first video terminal is located, and the second video information includes personal video information of each attendee in a site where the second video terminal is located, acquires a preset quantity of personal video information from the received second video information and first video information, and synthesizes the preset quantity of the personal video information to generate a synthesized video, so that attendees separately corresponding to the preset quantity of the personal video information are in a consistent site background in the synthesized video, and sends the synthesized video to a third video terminal to display. Because generation of a synthesized video is on the basis of video information of an attendee, a poor display effect due to site disparity when the integrated video of the site is used as a basis is avoided, a physical space limitation is broken through, and a flexibility for maximizing the information display efficiency is provided.

BRIEF DESCRIPTION OF DRAWINGS

To describe the technical solutions in the embodiments of the present invention more clearly, the following briefly introduces the accompanying drawings required for describing the embodiments. The accompanying drawings in the following description show some embodiments of the present invention, and persons of ordinary skill in the art may still derive other drawings from these accompanying drawings without creative efforts.

FIG. 8 is a flowchart of a sixth method for processing a video conference according to an embodiment of the present invention;

FIGS. 9A AND 9B are flowcharts of a seventh method for processing a video conference according to an embodiment of the present invention;

FIG. 12 is a flowchart of a tenth method for processing a video conference according to an embodiment of the present invention;

DESCRIPTION OF EMBODIMENTS

To make the objectives, technical solutions, and advantages of the embodiments of the present invention more clearly, the following clearly and describes the technical solutions in the embodiments of the present invention with reference to the accompanying drawings in the embodiments of the present invention. The described embodiments are a part rather than all of the embodiments of the present invention. All other embodiments obtained by persons of ordinary skill in the art based on the embodiments of the present invention without creative efforts shall fall within the protection scope of the present invention.

Figure 1:
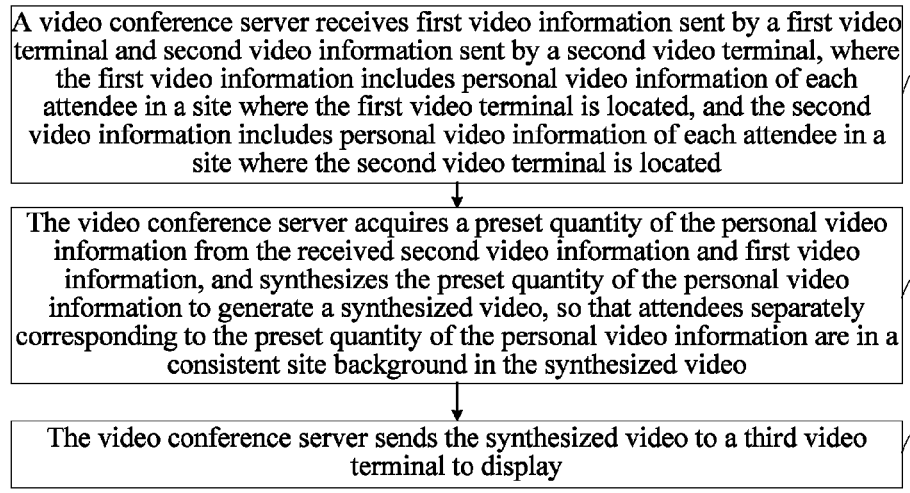
FIG. 1 is a flowchart of a first method for processing a video conference according to an embodiment of the present invention.

FIG. 1 is a flowchart of a first method for processing a video conference according to an embodiment of the present invention. As shown in FIG. 1, the method for processing a video conference according to the embodiment is applied to a processing process for a video generated in a video conference, and the method for processing a video conference according to the embodiment includes the follow steps.

Step S10. A video conference server receives first video information sent by a first video terminal and second video information sent by a second video terminal, where the first video information includes personal video information of each attendee in a site where the first video terminal is located, and the second video information includes personal video information of each attendee in a site where the second video terminal is located.

Step S20. The video conference server acquires a preset quantity of the personal video information from the received second video information and first video information, and synthesizes the preset quantity of the personal video information to generate a synthesized video, so that attendees separately corresponding to the preset quantity of the personal video information are in a consistent site background in the synthesized video.

Step S30. The video conference server sends the synthesized video to a third video terminal to display.

In some embodiments, there are at least two sites in a video conference and there is at least one attendee in each site. A video terminal is placed in each site, and a video collection apparatus used for collecting a video in the site, a voice collection apparatus used for collecting voice in the site, and a display apparatus used for displaying a video of another site are also placed in the site. The video collection apparatus may be a camera, the voice collection apparatus may be a microphone, and the display apparatus may be a display or a television (TV) set, or the like. The video collection apparatus, the voice collection apparatus, and the display apparatus may be integrated into a video terminal, and may be further placed independently. A video collection apparatus and a voice collection apparatus may be placed for each attendee in the site, which are specially used to collect a real-time personal video and voice of the attendee. The video terminal packages personal video information collected by each video collection apparatus to form video information and sends the video information to a video conference server, and sends voice collected by the voice collection apparatus to the video conference server at the same time. One video collection apparatus and one voice collection apparatus may also be placed in the site to uniformly collect videos and voices of all attendees. The video terminal sends a video collected by the video collection apparatus as video information to the video conference server, and sends voice collected by the voice collection apparatus to the video conference server, where the video information includes personal video information of each attendee, and the video conference server may separate the personal video information of each attendee. A site background of each site may be consistently set, and therefore a background of a site in which an attendee is located in each piece of personal video information is consistent. The site backgrounds of attendees displayed in the synthesized video may also be consistently set during a process for generating the synthesized video.

The video conference server separately generates, according to video information sent by each video terminal, a synthesized video for each video terminal, so that the video terminal in each site displays a video image of another site. To facilitate description, a process in which the video conference server generates a synthesized video for a video terminal is used as an example for describing this embodiment, where the video terminal is a third video terminal and other video terminals are a first video terminal and a second video terminal, video information received by the video conference server from the first video terminal is first video information, video information received by the video conference server from the second video terminal is second video information, and video information received by the video conference server from the third video terminal is third video information. In this embodiment, terms "first", "second", "third" are only used for differentiation rather than sequence limitation.

The video conference server acquires a total of a preset quantity of personal video information from the received second video information and first video information during the process for generating a synthesized video for the third video terminal. In an actual implementation process, the preset quantity of personal video information may be acquired from the first video information and the second video information according to a preset rule. The preset quantity may be set according to actual display effect requirements and specification parameters of a display apparatus, the acquired personal video information may all be personal video information in the first video information, may also all be personal video information in the second video information, and may further partially be the personal video information in the first video information and partially be the personal video information in the second video information. The rule may be preset in a plurality of manners, for example, in a first implementation manner, a preset quantity of personal video information in video information sent by a video terminal that first accesses the video conference server may be determined during initial processing of a video conference system, in a second implementation manner, each site has a priority that identifies degree of importance of the site, and a preset quantity of personal video information is determined from video information sent by a video terminal that corresponds to a site with the highest priority, in a third implementation manner, each attendee has a priority that identifies degree of importance of the attendee, and a preset quantity of video information may be determined according to priorities in a descending order, in a fourth implementation manner, the video terminal may further send an attendee identifier that indicates an attendee who is currently speaking to the video conference server, so that the video conference server may use video information of the attendee who is currently speaking as a part of the synthesized video. A preset rule may be set according to an actual conference requirement and is not limited by this embodiment.

The video conference server synthesizes the preset quantity of the personal video information as a synthesized video and sends the synthesized video to the third video terminal. The third video terminal displays the synthesized video for an attendee in a site where the third video terminal is located, or the third video terminal displays the synthesized video using an independent display apparatus to implement a video conference process.

According to the method for processing a video conference provided by this embodiment, a video conference server receives first video information sent by a first video terminal and second video information sent by a second video terminal, where the first video information includes personal video information of each attendee in a site where the first video terminal is located, and the second video information includes personal video information of each attendee in a site where the second video terminal is located, acquires a preset quantity of personal video information from the received second video information and first video information, and synthesizes the preset quantity of the personal video information to generate a synthesized video, so that attendees separately corresponding to the preset quantity of personal video information are in a consistent site background in the synthesized video, and sends the synthesized video to a third video terminal to display. Because generation of a synthesized video is on the basis of video information of an attendee, a poor display effect due to site disparity when the integrated video of the site is used as a basis is avoided, a physical space limitation is broken through, and a flexibility for maximizing the video display efficiency is provided.

Figure 2:
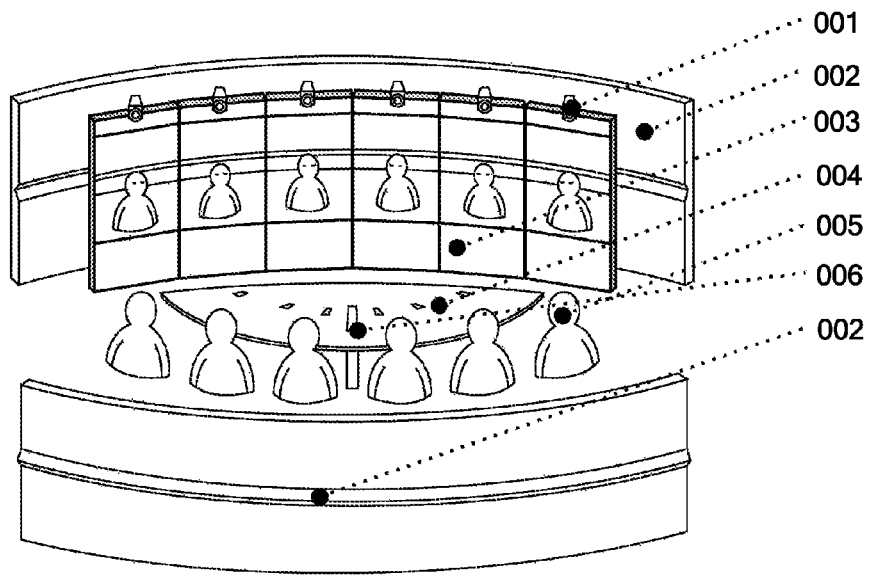
FIG. 2 is a schematic diagram of a site layout according to an embodiment of the present invention.

During an actual application, a layout of each site may be unified to achieve a better video conference effect. FIG. 2 is a schematic diagram of a site layout according to an embodiment of the present invention. As shown in FIG. 2, a video collection apparatus 001, a background wall apparatus 002, a large screen display apparatus 003, a voice locating and entry apparatus 004, an attendee seat apparatus 005, and a video terminal 006 may be placed in a site. The attendee seat apparatus 005 is configured to provide a seat for an attendee, where the seat may be a fixed seat such as a sofa and may also be a non-fixed seat such as a swivel chair with wheels, and a quantity of seats may be six, as shown in FIG. 2. A semicircular table may be arranged for the attendee seat apparatus 005, and the attendee seat apparatus 005 may be arranged according to the circular shape of the table. The large screen display apparatus 003 may be an apparatus formed by one or a plurality of large-sized displays, where the size of the large screen display apparatus 003 cannot be smaller than a fixed size, so that an image taken by the video collection apparatus 001 is close to a real scale of a figure size in visual perception when the apparatus displays the image, and the large screen display apparatus 003 is arranged in a circular shape. When a quantity of attendees in a synthesized video displayed by the large screen display apparatus 003 is also six, the attendees in the site and the attendees displayed in the large screen display apparatus 003 seem to hold a conference around a round table. When a video collection apparatus 001 is placed for each attendee, the video collection apparatus 001 may cooperate with the voice locating and entry apparatus 004 or use an instruction entered by other means to take an image of a specified area. The voice locating and entry apparatus 004 may be composed of one or a plurality of voice collection apparatuses and voice locating apparatuses. The voice locating apparatus captures a voice direction of an attendee, generates an instruction that is sent to the video collection apparatus 001, and records voice information of the position in which the voice is generated. Structural forms of the background wall apparatuses 002 in different sites are consistent, and are arranged behind the large screen display apparatus 003 and the attendee seat apparatus 005 and cannot be lower than a fixed dimension. A plurality of texture forms may be arranged for the background wall apparatus 002 to help the video conference server synthesize and process personal video information to generate a synthesized video, and the synthesized video presented on the large screen display apparatus 003 and the background wall apparatus 002 that is arranged behind the large screen display apparatus 003 and behind the attendee seat apparatus 005 are mutually spliced/stitched, so that attendees have experience of communicating in the same space in perception. The video terminal 006 may be achieved using, but not limited to a visual and tangible multipoint controller, a physical button controller, or another form. The video terminal 006 controls a communication requirement of each site, including but not limited to switching a display mode, switching personal video information, turning on or off voice control switchover, and demonstrating a document.

In this embodiment, an initialization processing process of a video conference server may be generating, according to a set rule, a synthesized video using personal video information in video information sent by a video terminal that first accesses the video conference server, in this way, the initial processing process is simplified, the speed for providing the synthesized video for the video terminal is improved, and a user's wait time is shortened. The set rule is used for indicating how to determine personal video information in the video information sent by the video terminal that first accesses the video conference server. For example, if a quantity of the personal video information in the video information sent by the video terminal that first accesses the video conference server is exactly equal to or less than a preset quantity, all the personal video information in the video information may be directly synthesized to generate a synthesized video, if the quantity of the personal video information in the video information sent by the video terminal that first accesses the video conference server is greater than the preset quantity, the personal video information may be selected in sequence according to the sequence of the personal video information in the video information, and personal video information of an attendee in a specified position may also be selected according to a user's preconfiguration.

Figure 3:
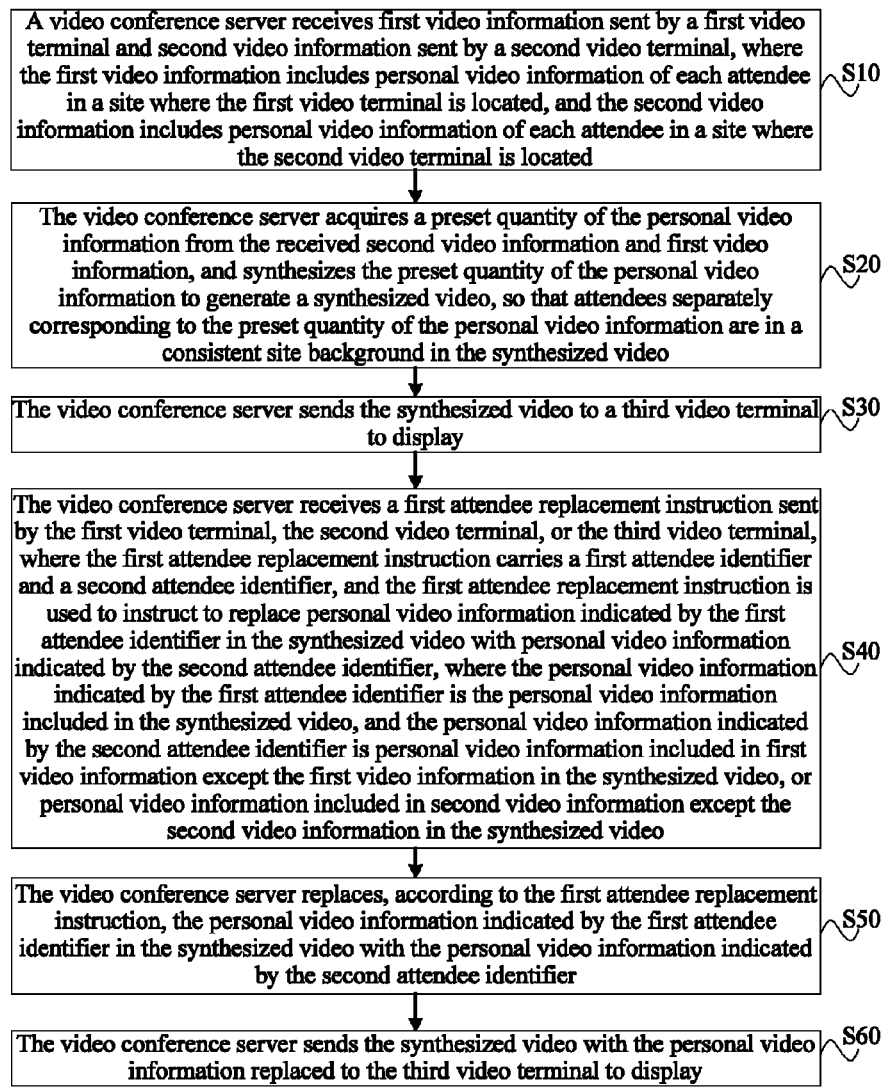
FIG. 3 is a flowchart of a second method for processing a video conference according to an embodiment of the present invention.

FIG. 3 is a flowchart of a second method for processing a video conference according to an embodiment of the present invention. As shown in FIG. 3, in step S30 of this embodiment, after the video conference server sends the synthesized video to a third video terminal to display, the method further includes the following steps.

Step S40. The video conference server receives a first attendee replacement instruction sent by the first video terminal, the second video terminal, or the third video terminal, where the first attendee replacement instruction carries a first attendee identifier and a second attendee identifier, and the first attendee replacement instruction is used to instruct to replace personal video information indicated by the first attendee identifier in the synthesized video with personal video information indicated by the second attendee identifier, where the personal video information indicated by the first attendee identifier is the personal video information included in the synthesized video, and the personal video information indicated by the second attendee identifier is personal video information included in first video information except the first video information in the synthesized video, or personal video information included in second video information except the second video information in the synthesized video.

Step S50. The video conference server replaces, according to the first attendee replacement instruction, the personal video information indicated by the first attendee identifier in the synthesized video with the personal video information indicated by the second attendee identifier.

Step S60. The video conference server sends the synthesized video with the replaced personal video information to the third video terminal to display.

Further, an identifier may be allocated in advance to each attendee who attends a conference, and processing related to the attendee during a video conference may be achieved using the identifier. In an application scenario in which sites use a unified layout, a quantity and placing positions of seats are fixed in each site, and to simplify a processing process, an identifier may be allocated to each seat to distinguish different attendees.

During initialization, a video terminal of each site accesses the video conference server, and the video conference server may determine a preset quantity of personal video information from video information sent by a video terminal that first accesses the video conference server, generate a synthesized video, and send the synthesized video to the third video terminal. An administrator or an attendee in a site where the third video terminal is located may switch, according to requirements, the personal video information in the synthesized video, for example, switch personal video information of a certain attendee in the synthesized video to personal video information of an attendee who the administrator or the attendee wants to see. The third video terminal may provide a visible man-machine interaction interface, where the man-machine interaction interface may achieve input of switching instruction information using, but not limited to manners such as a touch screen, a keyboard, or a gravity sensor, and a touch screen or an operation interface display may display an image interaction interface. The third video terminal displays an image and a serial number of each attendee for a user, and the user may directly click images of two attendees to be switched or serial numbers of the two attendees to achieve switchover. The third video terminal generates, according to the user input, a first attendee replacement instruction, where the first attendee replacement instruction carries a first attendee identifier and a second attendee identifier, and the first attendee identifier is used to indicate an attendee before switchover and the second attendee identifier is used to indicate an attendee after switchover.

The video conference server may further synchronize attendee information corresponding to the personal video information sent to the third video terminal with other video terminals, for example, the first video terminal and the second video terminal, so that an administrator or an attendee in a site where the first video terminal or the second video terminal is located may perform the foregoing switching operation according to a conference requirement, which are not further described herein.

In another application scenario, assume that seats are fixed and a quantity of seats is consistent in each site. For example, three sites, that is, site 1, site 2, and site 3, are set, and six seats are placed in each site, that is, seat 1, seat 2, seat 3, seat 4, seat 5, and seat 6. The third video terminal is placed in site 3, during initialization, the third video terminal displays video information of six attendees in site 1, a user can only click an image of an attendee who the user wants to see or enter the serial number of the attendee, if the attendee entered by the user is in seat 3 in site 2, the first attendee identifier carried in the first attendee replacement instruction generated by the third video terminal is used to indicate the attendee in seat 3 in site 1 and the second attendee identifier is used to indicate the attendee in seat 3 in site 2.

The foregoing switching process is triggered manually by the user, the video terminal provides a manual switching mode for the user, and the user is required to manually trigger the switching process when the user selects the manual switching mode.

In an actual application, a quantity of second attendee identifiers may be one or more, that is, personal video information of an attendee in a synthesized video is replaced with personal video information of one or a plurality of other attendees, and the quantity of second attendee identifiers cannot be excessively large to ensure a display effect.

Figure 4:
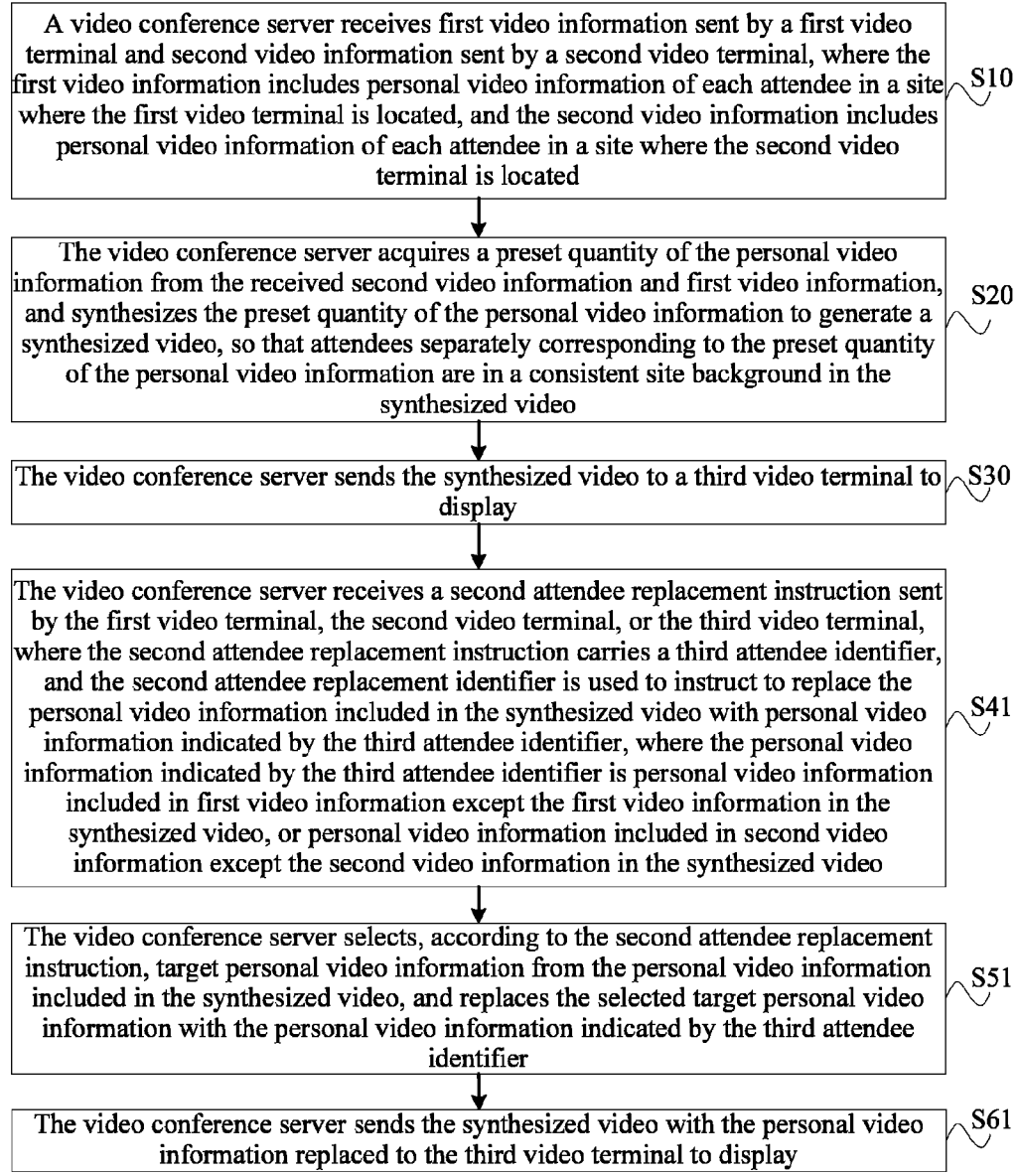
FIG. 4 is a flowchart of a third method for processing a video conference according to an embodiment of the present invention.

FIG. 4 is a flowchart of a third method for processing a video conference according to an embodiment of the present invention. As shown in FIG. 4, in step S30 in this embodiment, after the video conference server sends the synthesized video to a third video terminal to display, the method further includes the following steps.

Step S41: The video conference server receives a second attendee replacement instruction sent by the first video terminal, the second video terminal, or the third video terminal, where the second attendee replacement instruction carries a third attendee identifier, and the second attendee replacement instruction is used to instruct to replace the personal video information included in the synthesized video with personal video information indicated by the third attendee identifier, where the personal video information indicated by the third attendee identifier is personal video information included in first video information except the first video information in the synthesized video, or personal video information included in second video information except the second video information in the synthesized video.

Step S51: The video conference server selects, according to the second attendee replacement instruction, target personal video information from the personal video information included in the synthesized video, and replaces the selected target personal video information with the personal video information indicated by the third attendee identifier.

Step S61: The video conference server sends the synthesized video with the replaced personal video information to the third video terminal to display.

Further, the switching process may be triggered using voice control. When an attendee in a certain site speaks, a video terminal may identify, according to voice uploaded by a voice collection apparatus, that the attendee is in a speaking state, or a speaking button may further be set, so that the video terminal may learn the attendee who is currently speaking when the attendee touches the button when speaking. The video terminal generates the second attendee replacement instruction and the second attendee replacement instruction carries an identifier used for indicating an attendee who is currently speaking. The video conference server may determine, according to a second preset rule, an attendee to be replaced, where the second preset rule may further be set in advance, for example, replacing an attendee in a corresponding position in the synthesized video according to the position of the attendee who is speaking.

The following is still used as an example for description; three sites, that is, site 1, site 2, and site 3, are set, and six seats are placed in each site, that is, seat 1, seat 2, seat 3, seat 4, seat 5, and seat 6. The third video terminal is set in site 3, during initialization, the third video terminal displays personal video information of six attendees in site 1, an attendee in seat 2 in site 2 starts to speak, and the video terminal in site 2 generates an attendee replacement instruction when detecting that the attendee is speaking, where the attendee replacement instruction carries an identifier used for indicating the attendee in seat 2 in site 2. When receiving the attendee replacement instruction, the video conference server synthesizes personal video information of the attendee who is speaking to a synthesized video to achieve switchover during the process for generating the synthesized video for another video terminal, for example, replacing personal video information of a certain attendee in the synthesized video sent to the third video terminal with personal video information of the attendee in seat 2 in site 2.

The video terminal may further provide a voice control switching mode for a user, and a switching process is triggered using voice when the user selects this mode. Certainly, in an actual application process, a manual switching mode and a voice control switching module may co-exist, voice control switching may be a primary switching mode to ensure that an attendee can see a speaker, and the manual switching mode may be an auxiliary switching mode to ensure that the attendee can see an important attendee who the attendee wants to see.

In this embodiment, the second attendee replacement instruction further carries location information, in step S51, that the video conference server selects, according to the second attendee replacement instruction, target personal video information from the personal video information included in the synthesized video includes:

The video conference server uses, according to the second attendee replacement instruction, the personal video information that corresponds to the location information included in the second attendee replacement instruction and is included in the synthesized video as the target personal video information.

Further, the video conference server stores a correspondence between an attendee identifier and location information of the attendee, where the location information of the attendee may be acquired from the foregoing correspondence according to the third attendee identifier, and the location information may be carried in the second attendee replacement instruction sent by the video terminal. When a quantity of attendees in each site is consistent and a quantity of video information in the synthesized video is equal to the quantity of attendees in the site, the position of each attendee in the synthesized video displayed in the site is the same as the position of an attendee in an actual site, and attendees in the same positions are switched over during switching, thereby reducing an unexpected sense caused during switching.

Figure 5:
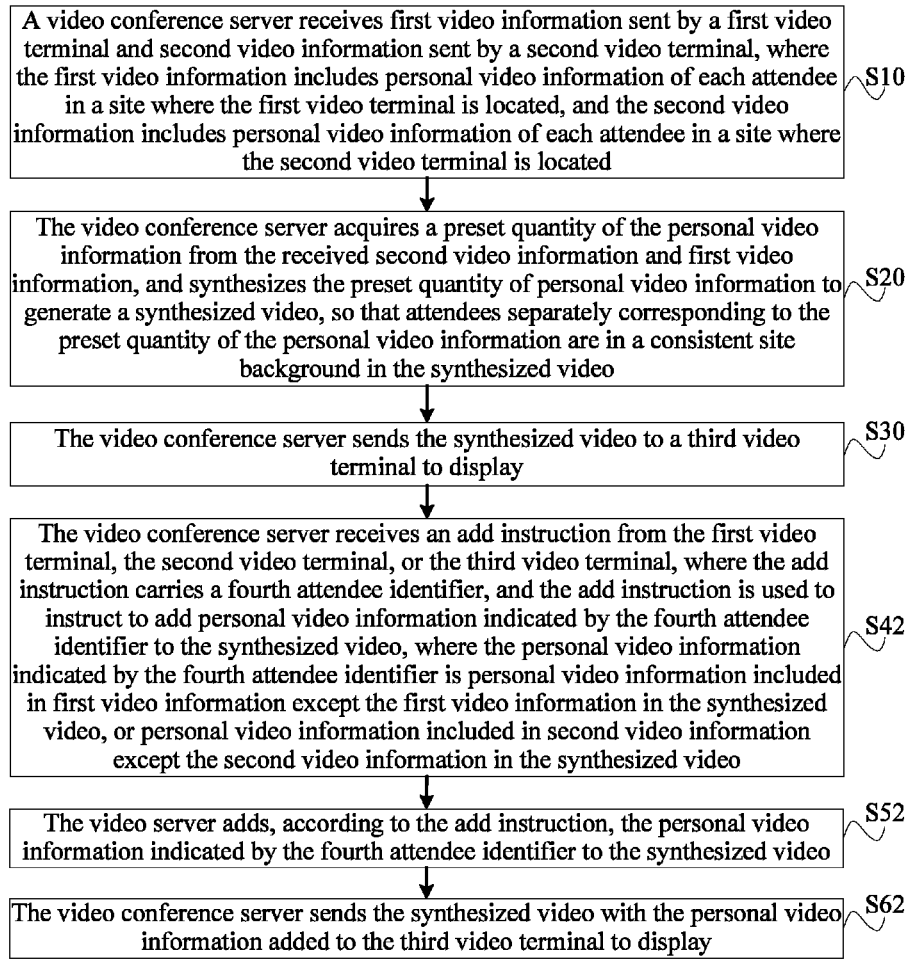
FIG. 5 is a flowchart of a fourth method for processing a video conference according to an embodiment of the present invention.

FIG. 5 is a flowchart of a fourth method for processing a video conference according to an embodiment of the present invention. As shown in FIG. 5, in step S30 in this embodiment, after the video conference server sends the synthesized video to a third video terminal to display, the method further includes the following steps:

Step S42: The video conference server receives an add instruction from the first video terminal, the second video terminal, or the third video terminal, where the add instruction carries a fourth attendee identifier, and the add instruction is used to instruct to add personal video information indicated by the fourth attendee identifier to the synthesized video, where the personal video information indicated by the fourth attendee identifier is personal video information included in first video information except the first video information in the synthesized video, or personal video information included in second video information except the second video information in the synthesized video.

Step S52: The video server adds, according to the add instruction, the personal video information indicated by the fourth attendee identifier to the synthesized video.

Step S62: The video conference server sends the synthesized video with the added personal video information to the third video terminal to display.

Further, if an administrator or an attendee in a site where a video terminal is located may add, according to a requirement, a video of an attendee who the administrator or the attendee wants to see, to a synthesized video, the administrator or the attendee may enter add instruction information so that the video terminal generates an add instruction. A quantity of fourth attendee identifiers may be one or more, and the quantity of fourth attendee identifiers cannot be excessively large to ensure a display effect.

Figure 6:
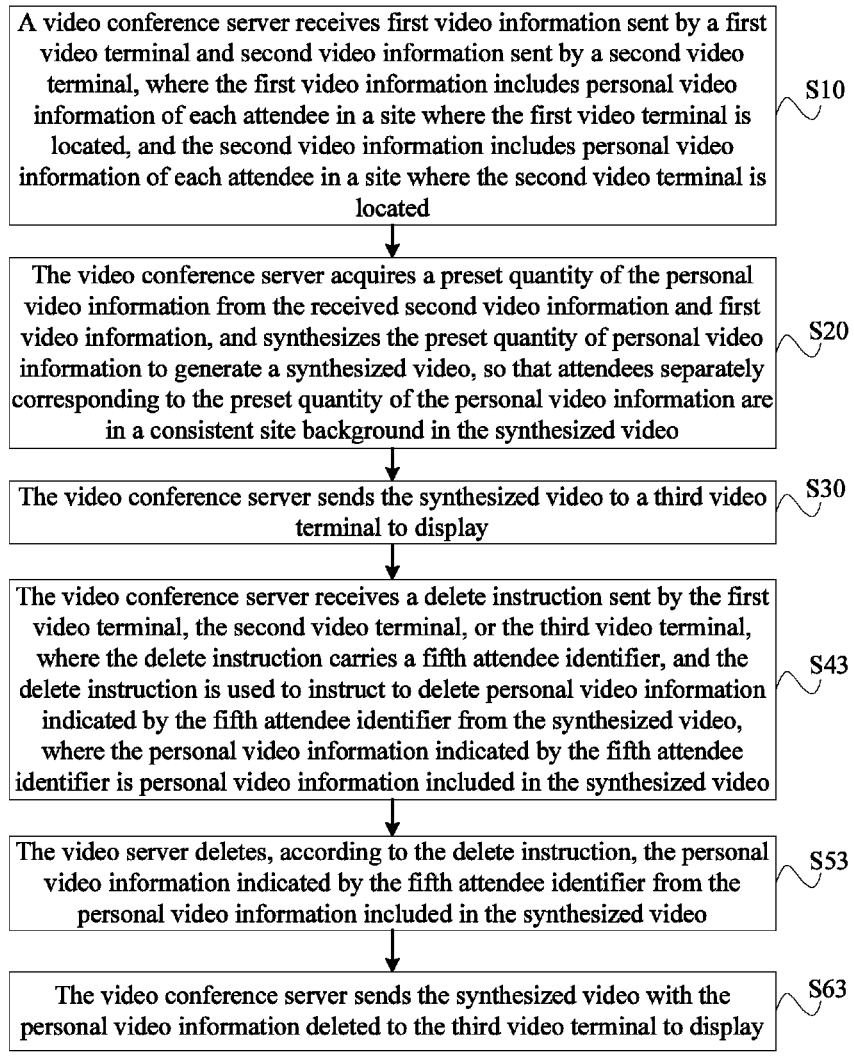
FIG. 6 is a flowchart of a fifth method for processing a video conference according to an embodiment of the present invention.

FIG. 6 is a flowchart of a fifth method for processing a video conference according to an embodiment of the present invention. As shown in FIG. 6, in step S30 in this embodiment, after the video conference server sends the synthesized video to a third video terminal to display, the method further includes the following steps:

Step S43: The video conference server receives a delete instruction sent by the first video terminal, the second video terminal, or the third video terminal, where the delete instruction carries a fifth attendee identifier, and the delete instruction is used to instruct to delete personal video information indicated by the fifth attendee identifier from the synthesized video, where the personal video information indicated by the fifth attendee identifier is the personal video information included in the synthesized video.

Step S53: The video server deletes, according to the delete instruction, the personal video information indicated by the fifth attendee identifier from the personal video information included in the synthesized video.

Step S63: The video conference server sends the synthesized video with the deleted personal video information to the third video terminal to display.

Further, if an administrator or an attendee in the site where the video terminal is located may delete, according to a requirement, a video of an attendee, from the synthesized video, the administrator or the attendee may enter delete instruction information so that the video terminal generates a delete instruction. A quantity of fifth attendee identifiers may be one or more, and the location of video information deleted from the synthesized video may be displayed using static screen conversion to ensure a display effect.

Figure 7:
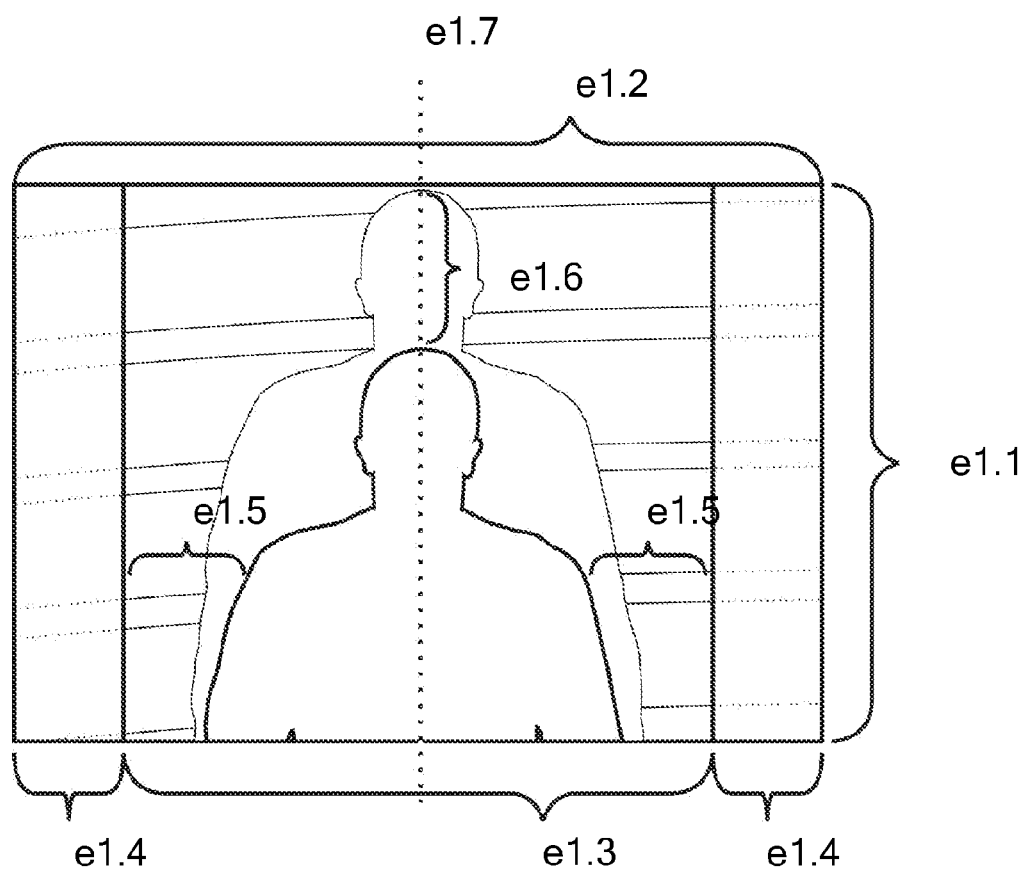
FIG. 7 is a schematic diagram of an image unit according to an embodiment of the present invention.

There may be various manners of generating a synthesized video by a video conference server, to ensure that dimensions of each attendee in the synthesized video is consistent. To decrease processing difficulty for the video conference server, an attendee seat and a video collection apparatus are arranged in corresponding physical locations, the video collection apparatus may, based on but not limited to existing technologies such as human face capture and human body infrared signature capture, arrange the pictured attendees in an image unit with preset dimensions. As shown in FIG. 7, the dimensions of the image unit is $e1.1 \times e1.2$, and images of the attendees are arranged at the $e1.7$ axis in the image unit with the dimensions e1.1×e1.2. Because a video is a series of consecutive and dynamic images, a user is allowed to move within a threshold of a small range at the e1.7 axis in the image unit with the dimensions e1.1×e1.2. Preferably, the e1.1×e1.2 dimensions of a unit meet a specification requirement of the e1.3, e1.5, and e1.6 dimensions. An e1.1×e1.3 image unit is a minimum display unit, and a definition of the e1.5 dimensions is to be in accord with natural hand motion of a user in a multipoint video conference and to ensure that an action of an attendee within a certain range is successfully taken by the video collection apparatus. A definition of the e1.6 dimensions is based on a picture that is taken by the video collection apparatus and in which an attendee mainly sits, and when the attendee has a standup requirement, and the definition ensures that the video collection apparatus can successfully take an overall picture for an attendee who is standing and avoids a situation in which the head of the attendee is out of a picture scope.

In this embodiment, in step S30, the synthesizing, by the video conference server, the preset quantity of the personal video information to generate a synthesized video includes:

The video conference server splices corresponding images in the preset quantity of the personal video information to generate a synthesized image, where the corresponding images in the preset quantity of the personal video information are synchronous in time sequence, and combines a plurality of the synthesized images to generate a synthesized video.

Further, in an implementation manner of synthesizing a video, a merging area with dimensions e1.1×e1.4 may be set in the image unit illustrated in FIG. 7, and the area is used for overlapping during synthesizing by a plurality of image units with dimensions e1.1×e1.2, and merging areas are merged. A merging area is set and merging areas are merged during the synthesizing of personal video information, therefore, each piece of personal video information is naturally joined, thereby improving a display effect of a video conference.

If specifications of video information sent by a video terminal in a system are not the foregoing preset specifications, the video information is compatible based on a display mechanism on a per-attendee basis in the present invention. Dimensions of a personal video in video information sent by a certain video terminal are f1×f2, a proportion of a picture in a vertical direction is adjusted to match e1.1, and a merging area with dimensions e1.1×e1.4 is reserved on both sides of the picture to merge with other personal video information. If a site has only voice access instead of video access, an obvious icon that indicates the access source may be set for the site, and the icon may be the foregoing dimensions e1.1×e1.2, and a merging area with dimensions e1.1×e1.4 is set.

In an actual application, preferably, personal video information in a synthesized video is arranged in a transverse line to achieve a display effect of a simulated site. Personal video information in the synthesized video may also be displayed in a plurality of lines to achieve a display effect of a simulated amphitheater site.

In this embodiment, in step S30, the synthesizing, by the video conference server, the preset quantity of the personal video information to generate a synthesized video includes:

The video conference server arranges image information extracted from the preset quantity of the personal video information in a preset background image to generate a synthesized image, where image information included in the preset quantity of the personal video information acquired from the first video information and the second video information is synchronous in time sequence, and combines a plurality of the synthesized images to generate a synthesized video.

Further, in an implementation manner of synthesizing a video, the video conference server may, based on but not limited to existing technologies such as image matting, mat a figure of an attendee in personal video information from a current background image and merge the figure in a preset background image to obtain the synthesized video. When a background wall is placed in a site, the preset background image may be consistent with a background wall image to achieve a picture effect of a unified site. During an actual application, a figure matting task may further be implemented by a video terminal, and the video terminal may directly send a mat figure to a video conference server.

FIG. 8 is a flowchart of a sixth method for processing a video conference according to an embodiment of the present invention. As shown in FIG. 8, a method for processing a video conference according to this embodiment may be achieved together with a method applied to a video conference server provided by any embodiment of the present invention, and a specific implementation process is not further described herein. A method for processing a video conference according to the embodiment includes the following steps:

Step C10: A third video terminal receives a synthesized video sent by a video conference server, where the synthesized video is acquired, by the video conference server, by synthesizing a preset quantity of personal video information acquired from first video information received from a first video terminal and second video information received from a second video terminal, where attendees separately corresponding to the preset quantity of the personal video information are in a consistent site background in the synthesized video, the first video information includes personal video information of each attendee in a site where the first video terminal is located, and the second video information includes personal video information of each attendee in a site where the second video terminal is located.

Step C20: The third video terminal displays the synthesized video.

According to the method for processing a video conference in this embodiment, a third video terminal receives a synthesized video sent by a video conference server, where the synthesized video is acquired, by the video conference server, by synthesizing a preset quantity of personal video information acquired from first video information received from a first video terminal and second video information received from a second video terminal, where attendees separately corresponding to the preset quantity of the personal video information are in a consistent site background in the synthesized video, the first video information includes personal video information of each attendee in a site where the first video terminal is located, and the second video information includes personal video information of each attendee in a site where the second video terminal is located, and displays the synthesized video. Because generation of a synthesized video is on the basis of video information of an attendee, a poor display effect due to site disparity when the integrated video of the site is used as a basis is avoided, a physical space limitation is broken through, and a flexibility for maximizing the information display efficiency is provided.

FIGS. 9A AND 9B are flowcharts of a seventh method for processing a video conference according to an embodiment of the present invention. As shown in FIG. 9A, in step C10 in this embodiment, the method further includes the following steps:

Step C30: The third video terminal receives video information sent by at least one video collection apparatus, and packages the received video information to form third video information, where each of the at least one video collection apparatus is configured to collect video information of at least one attendee in a site where the third video terminal is located, and the third video information includes personal video information of each of the at least one attendee in the site where the third video terminal is located.

Step C31: The third video terminal sends the third video information to the video conference server so that the video conference server generates, according to the third video information and the first video information, a synthesized video and sends the synthesized video to the second video terminal, or generates, according to the third video information and the second video information, a synthesized video and sends the synthesized video to the first video terminal.

In this embodiment, in step C20, after the displaying, by the third video terminal, the synthesized video, the method further includes:

Step C40: The third video terminal generates, according to switching instruction information entered by a user, a first attendee replacement instruction, where the first attendee replacement instruction carries a first attendee identifier and a second attendee identifier, and the first attendee replacement instruction is used to instruct to replace personal video information indicated by the first attendee identifier in the synthesized video with personal video information indicated by the second attendee identifier, where the personal video information indicated by the first attendee identifier is the personal video information included in the synthesized video, and the personal video information indicated by the second attendee identifier is personal video information included in first video information except the first video information in the synthesized video, or personal video information included in second video information except the second video information in the synthesized video.

Step C50: The third video terminal sends the first attendee replacement instruction to the video conference server, so that the video conference server replaces, according to the first attendee replacement instruction, the personal video information indicated by the first attendee identifier in the synthesized video with the personal video information indicated by the second attendee identifier.

Step C60: The third video terminal receives the synthesized video with the replaced personal video information according to the first attendee replacement instruction from the video conference server, and displays the synthesized video.

Figure 10:
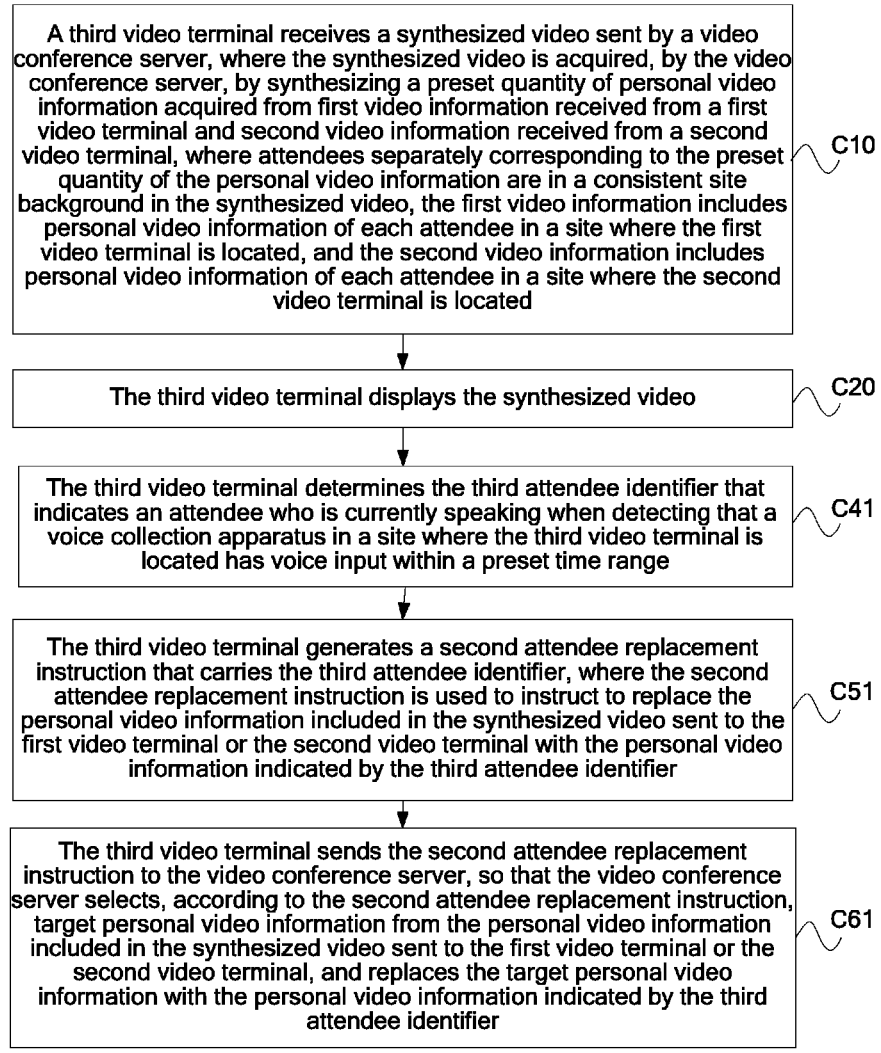
FIG. 10 is a flowchart of an eighth method for processing a video conference according to an embodiment of the present invention.

FIG. 10 is a flowchart of an eighth method for processing a video conference according to an embodiment of the present invention. As shown in FIG. 10, in step C20 in this embodiment, after the displaying, by the third video terminal, the synthesized video, the method further includes the following steps:

Step C41: The third video terminal determines the third attendee identifier that indicates an attendee who is currently speaking when detecting that a voice collection apparatus in a site where the third video terminal is located has voice input within a preset time range.

Step C51: The third video terminal generates a second attendee replacement instruction that carries the third attendee identifier, where the second attendee replacement instruction is used to instruct to replace the personal video information included in the synthesized video sent to the first video terminal or the second video terminal with the personal video information indicated by the third attendee identifier.

Step C61: The third video terminal sends the second attendee replacement instruction to the video conference server, so that the video conference server selects, according to the second attendee replacement instruction, target personal video information from the personal video information included in the synthesized video sent to the first video terminal or the second video terminal, and replaces the target personal video information with the personal video information indicated by the third attendee identifier.

Further, if strength of a voice captured by the third video terminal is greater than a preset threshold of the voice within a period, it is considered that an attendee is speaking, thereby avoiding frequent triggering of a switchover process by sudden sound.

Figure 11:
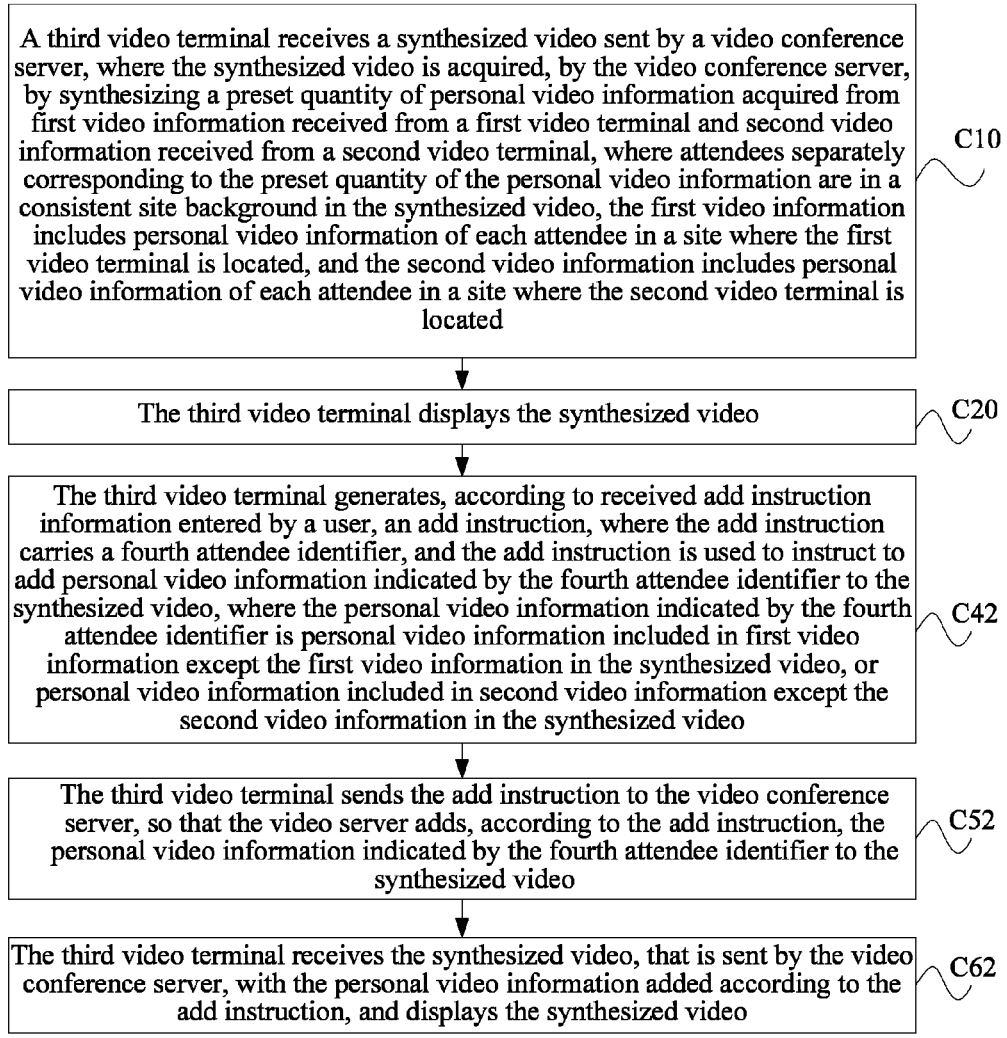
FIG. 11 is a flowchart of a ninth method for processing a video conference according to an embodiment of the present invention.

FIG. 11 is a flowchart of a ninth method for processing a video conference according to an embodiment of the present invention. As shown in FIG. 11, in step C20 in this embodiment, after the displaying, by the third video terminal, the synthesized video, the method further includes the following steps:

Step C42: The third video terminal generates, according to received add instruction information entered by a user, an add instruction, where the add instruction carries a fourth attendee identifier, and the add instruction is used to instruct to add personal video information indicated by the fourth attendee identifier to the synthesized video, where the personal video information indicated by the fourth attendee identifier is personal video information included in first video information except the first video information in the synthesized video, or personal video information included in second video information except the second video information in the synthesized video.

Step C52: The third video terminal sends the add instruction to the video conference server, so that the video server adds, according to the add instruction, the personal video information indicated by the fourth attendee identifier to the synthesized video.

Step C62: The third video terminal receives the synthesized video, that is sent by the video conference server, with the personal video information added according to the add instruction, and displays the synthesized video.

FIG. 12 is a flowchart of a tenth method for processing a video conference according to an embodiment of the present invention. As shown in FIG. 12, in step C20 in this embodiment, after the displaying, by the third video terminal, the synthesized video, the method further includes the following steps:

Step C43: The third video terminal generates, according to received delete instruction information entered by a user, a delete instruction, where the delete instruction carries a fifth attendee identifier, and the delete instruction is used to instruct to delete personal video information indicated by the fifth attendee from the personal video information included in the synthesized video, where the personal video information indicated by the fifth attendee identifier is the personal video information included in the synthesized video.

Step C53: The third video terminal sends the delete instruction to the video conference server, so that the video server deletes, according to the delete instruction, the personal video information indicated by the fifth attendee identifier from the personal video information included in the synthesized video.

Step C63: The third video terminal receives the synthesized video, that is sent by the video conference server, with the personal video information deleted according to the delete instruction, and displays the synthesized video.

Figure 13:
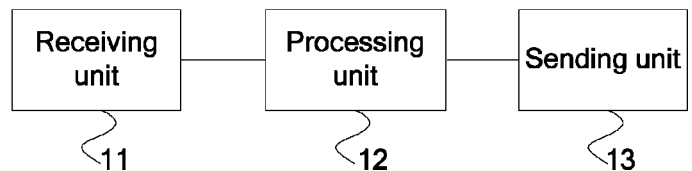
FIG. 13 is a schematic structural diagram of a first type of video conference server according to an embodiment of the present invention.

FIG. 13 is a schematic structural diagram of a first type of video conference server according to an embodiment of the present invention. As shown in FIG. 13, a video conference server provided by this embodiment may perform each step of the method for processing a video conference applied to the video conference server provided by any embodiment of the present invention, and a specific implementation is not further described herein.

The video conference server provided by this embodiment includes a receiving unit 11 configured to receive first video information sent by a first video terminal and second video information sent by a second video terminal, where the first video information includes personal video information of each attendee in a site where the first video terminal is located, and the second video information includes personal video information of each attendee in a site where the second video terminal is located, a processing unit 12, connected to the receiving unit 11, and configured to acquire a preset quantity of the personal video information from the received second video information and first video information, and synthesize the preset quantity of the personal video information to generate a synthesized video, so that attendees separately corresponding to the preset quantity of the personal video information are in a consistent site background in the synthesized video, and a sending unit 13, connected to the processing unit 12, and configured to send the synthesized video to a third video terminal to display.

In the video conference server provided by this embodiment, because generation of a synthesized video is on the basis of video information of an attendee, a poor display effect due to site disparity when the integrated video of the site is used as a basis is avoided, a physical space limitation is broken through, and a flexibility for maximizing the information display efficiency is provided.

In this embodiment, the receiving unit 11 is further configured to receive a first attendee replacement instruction sent by the first video terminal, the second video terminal, or the third video terminal, where the first attendee replacement instruction carries a first attendee identifier and a second attendee identifier, and the first attendee replacement instruction is used to instruct to replace personal video information indicated by the first attendee identifier in the synthesized video with personal video information indicated by the second attendee identifier, where the personal video information indicated by the first attendee identifier is the personal video information included in the synthesized video, the personal video information indicated by the second attendee identifier is personal video information included in first video information except the first video information in the synthesized video, or personal video information included in second video information except the second video information in the synthesized video. The processing unit 12 is further configured to replace, according to the first attendee replacement instruction, the personal video information indicated by the first attendee identifier in the synthesized video with the personal video information indicated by the second attendee identifier. The sending unit 13 is further configured to send the synthesized video with the replaced personal video information to the third video terminal to display.

In this embodiment, the receiving unit 11 is further configured to receive a first attendee replacement instruction sent by the first video terminal, the second video terminal, or the third video terminal, where the second attendee replacement instruction carries a third attendee identifier, and the second attendee replacement instruction is used to instruct to replace the personal video information included in the synthesized video with personal video information indicated by the third attendee identifier, where the personal video information indicated by the third attendee identifier is personal video information included in first video information except the first video information in the synthesized video, or personal video information included in second video information except the second video information in the synthesized video. The processing unit 12 is further configured to select, according to the second attendee replacement instruction, target personal video information from the personal video information included in the synthesized video, and replace the selected target personal video information with the personal video information indicated by the third attendee identifier. The sending unit 13 is further configured to send the synthesized video with the replaced personal video information to the third video terminal to display.

In this embodiment, the second attendee replacement instruction further carries location information. The processing unit 12 is further configured to use, according to the second attendee replacement instruction, the personal video information that corresponds to the location information included in the second attendee replacement instruction and is included in the synthesized video as the target personal video information.

In this embodiment, the receiving unit 11 is further configured to receive an add instruction from the first video terminal, the second video terminal, or the third video terminal, where the add instruction carries a fourth attendee identifier, and the add instruction is used to instruct to add personal video information indicated by the fourth attendee identifier to the synthesized video, where the personal video information indicated by the fourth attendee identifier is personal video information included in first video information except the first video information in the synthesized video, or personal video information included in second video information except the second video information in the synthesized video. The processing unit 12 is further configured to add, according to the add instruction, the personal video information indicated by the fourth attendee identifier to the synthesized video. The sending unit 13 is further configured to send the synthesized video with the added personal video information to the third video terminal to display.

In this embodiment, the receiving unit 11 is further configured to receive a delete instruction sent by the first video terminal, the second video terminal, or the third video terminal, where the delete instruction carries a fifth attendee identifier, and the delete instruction is used to instruct to delete personal video information indicated by the fifth attendee identifier from the synthesized video, where the personal video information indicated by the fifth attendee identifier is the personal video information included in the synthesized video. The processing unit 12 is further configured to delete, according to the delete instruction, the personal video information indicated by the fifth attendee identifier from the personal video information included in the synthesized video. The sending unit 13 is further configured to send the synthesized video with the deleted personal video information to the third video terminal to display.

In this embodiment, the processing unit 12 is further configured to splice corresponding images in the preset quantity of the personal video information to generate a synthesized image, where the corresponding images in the preset quantity of the personal video information are synchronous in time sequence, and combine a plurality of the synthesized images to generate a synthesized video.

In this embodiment, the processing unit 12 is further configured to arrange image information included in the preset quantity of the personal video information in a preset background image to generate a synthesized image, where the image information included in the preset quantity of the personal video information acquired from the first video information and the second video information is synchronous in time sequence, and combine a plurality of the synthesized images to generate a synthesized video.

Figure 14:
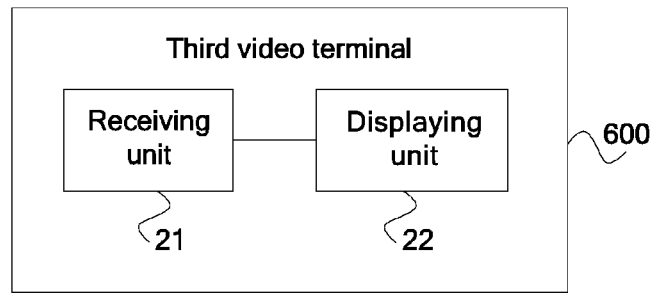
FIG. 14 is a schematic structural diagram of a first type of first video terminal according to an embodiment of the present invention.

FIG. 14 is a schematic structural diagram of a first type of third video terminal according to an embodiment of the present invention. As shown in FIG. 14, a third video terminal 600 provided by this embodiment may perform each step of the method for processing a video conference applied to the third video terminal provided by any embodiment of the present invention, and a specific implementation process is not further described herein.

The third video terminal 600 provided by this embodiment includes a receiving unit 21 configured to receive a synthesized video sent by a video conference server, where the synthesized video is acquired, by the video conference server, by synthesizing a preset quantity of personal video information acquired from first video information received from a first video terminal and second video information received from a second video terminal, where attendees separately corresponding to the preset quantity of the personal video information are in a consistent site background in the synthesized video, the first video information includes personal video information of each attendee in a site where the first video terminal is located, and the second video information includes personal video information of each attendee in a site where the second video terminal is located, and a displaying unit 22, connected to the receiving unit 21, and configured to display the synthesized video.

In the third video terminal 600 provided by this embodiment, because generation of a synthesized video is on the basis of video information of an attendee, a poor display effect due to site disparity when the integrated video of the site is used as a basis is avoided, a physical space limitation is broken through, and a flexibility for maximizing the information display efficiency is provided.

Figure 15:
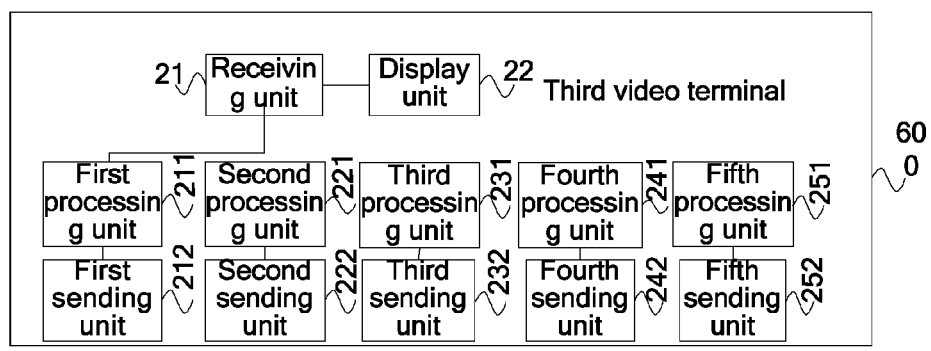
FIG. 15 is a schematic structural diagram of a second type of first video terminal according to an embodiment of the present invention.

FIG. 15 is a schematic structural diagram of a second type of third video terminal 600 according to an embodiment of the present invention. As shown in FIG. 15, in this embodiment, the receiving unit 21 is further configured to receive video information sent by at least one video collection apparatus. The second type of third video terminal 600 further includes a first processing unit 211, connected to the receiving unit 21, and configured to package received video information to form third video information, where each of the at least one video collection apparatus is configured to collect video information of at least one attendee in a site where the second type of third video terminal 600 is located, and the third video information includes personal video information of each of the at least one attendee in the site where the second type of third video terminal 600 is located, and a first sending unit 212, connected to the first processing unit 211, and configured to send the third video information to the video conference server, so that the video conference server generates, according to the third video information and the first video information, a synthesized video and sends the synthesized video to the second video terminal, or generates, according to the third video information and the second video information, a synthesized video and sends the synthesized video to the first video terminal.

In this embodiment, the second type of third video terminal 600 may further include a second processing unit 221 configured to generate, according to switching instruction information entered by a user, a first attendee replacement instruction, where the first attendee replacement instruction carries a first attendee identifier and a second attendee identifier, and the first attendee replacement instruction is used to instruct to replace personal video information indicated by the first attendee identifier in the synthesized video with personal video information indicated by the second attendee identifier, where the personal video information indicated by the first attendee identifier is the personal video information included in the synthesized video, the personal video information indicated by the second attendee identifier is personal video information included in first video information except the first video information in the synthesized video, or personal video information included in second video information except the second video information in the synthesized video, and a second sending unit 222, connected to the second processing unit 221, and configured to send the first attendee replacement instruction to the video conference server, so that the video conference server replaces, according to the first attendee replacement instruction, the personal video information indicated by the first attendee identifier in the synthesized video with the personal video information indicated by the second attendee identifier.

The receiving unit 21 is further configured to receive the synthesized video, that is sent by the video conference server, with the replaced personal video information according to the first attendee replacement instruction, and display the synthesized video using the display unit 22.

In this embodiment, the second type of third video terminal 600 may further include a third processing unit 231 configured to determine a third attendee identifier indicating an attendee who is currently speaking when detecting that a voice collection apparatus in a site where the second type of third video terminal 600 is located has voice input within a preset time range, and generate a second attendee replacement instruction that carries the third attendee identifier, where the second attendee replacement instruction is used to instruct to replace the personal video information included in the synthesized video sent to the first video terminal or the second video terminal with personal video information indicated by the third attendee identifier, and a third sending unit 232, connected to the third processing unit 231, and configured to send the second attendee replacement instruction to the video conference server, so that the video conference server selects, according to the second attendee replacement instruction, target personal video information from the personal video information included in the synthesized video sent to the first video terminal or the second video terminal, and replaces the target personal video information with the personal video information indicated by the third attendee identifier.

In this embodiment, the second type of third video terminal 600 may further include a fourth processing unit 241 configured to generate, according to received add instruction information entered by a user, an add instruction, where the add instruction carries a fourth attendee identifier, and the add instruction is used to instruct to add personal video information indicated by the fourth attendee identifier to the synthesized video, where the personal video information indicated by the fourth attendee identifier is personal video information included in first video information except the first video information in the synthesized video, or personal video information included in second video information except the second video information in the synthesized video, and a fourth sending unit 242, connected to the fourth processing unit 241, and configured to send the add instruction to the video conference server, so that the video server adds, according to the add instruction, the personal video information indicated by the fourth attendee identifier to the synthesized video.

The receiving unit 21 is further configured to receive the synthesized video, that is sent by the video conference server, with the personal video information added according to the add instruction, and display the synthesized video using the display unit 22.

In this embodiment, the second type of third video terminal 600 may further include a fifth processing unit 251 configured to generate, according to received delete instruction information entered by a user, a delete instruction, where the delete instruction carries a fifth attendee identifier, and the delete instruction is used to instruct to delete personal video information indicated by the fifth attendee from the personal video information included in the synthesized video, where the personal video information indicated by the fifth attendee identifier is the personal video information included in the synthesized video, and a fifth sending unit 252, connected to the fifth processing unit 251, and configured to send the delete instruction to the video conference server, so that the video server deletes, according to the delete instruction, the personal video information indicated by the fifth attendee identifier from the personal video information included in the synthesized video.

The receiving unit 21 is further configured to receive the synthesized video, that is sent by the video conference server, with the personal video information deleted according to the delete instruction, and display the synthesized video using the display unit 22.

Figure 16:
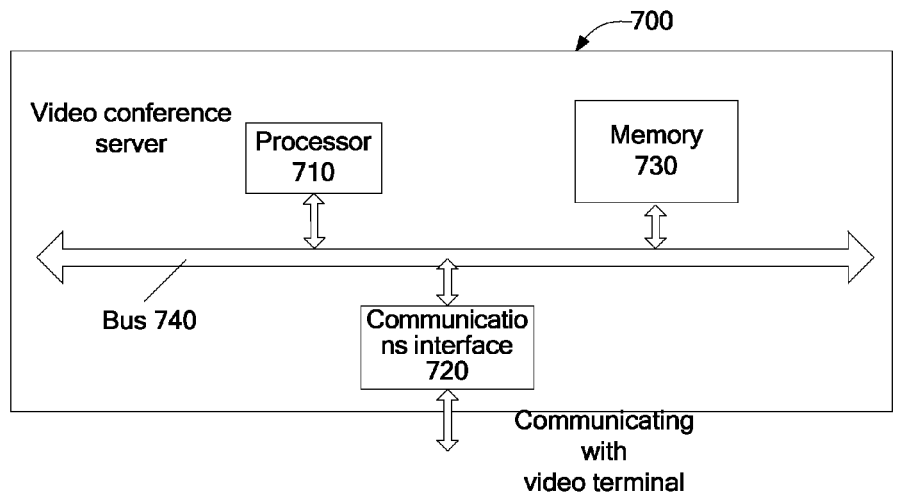
FIG. 16 is a schematic structural diagram of a second type of video conference server according to an embodiment of the present invention.

FIG. 16 is a schematic structural diagram of a second type of video conference server according to an embodiment of the present invention. As shown in FIG. 16, a video conference server 700 provided by this embodiment may perform each step of the method for processing a video conference applied to the video conference server provided by any embodiment of the present invention, and a specific implementation process is not further described herein.

The video conference server 700 provided by this embodiment includes a processor 710, a communications interface 720, a memory 730, and a bus 740, where the processor 710, the communications interface 720, and the memory 730 are interconnected using the bus 740. The communications interface 720 is configured to receive first video information sent by a first video terminal and second video information sent by a second video terminal, where the first video information includes personal video information of each attendee in a site where the first video terminal is located, and the second video information includes personal video information of each attendee in a site where the second video terminal is located. The memory 730 is configured to store an instruction or data. The processor 710 is configured to call an instruction stored in the memory 730 to receive a preset quantity of the personal video information from the received second video information and first video information, and synthesize the preset quantity of the personal video information to generate a synthesized video, so that attendees separately corresponding to the preset quantity of the personal video information are in a consistent site background in the synthesized video. The communications interface 720 is further configured to send the synthesized video to a third video terminal to display.

In this embodiment, the communications interface 720 is further configured to receive a first attendee replacement instruction sent by the first video terminal, the second video terminal, or the third video terminal, where the first attendee replacement instruction carries a first attendee identifier and a second attendee identifier, and the first attendee replacement instruction is used to instruct to replace personal video information indicated by the first attendee identifier in the synthesized video with personal video information indicated by the second attendee identifier, where the personal video information indicated by the first attendee identifier is the personal video information included in the synthesized video, the personal video information indicated by the second attendee identifier is personal video information included in first video information except the first video information in the synthesized video, or personal video information included in second video information except the second video information in the synthesized video. The processor 710 is further configured to call an instruction and data in the memory 730, to replace, according to the first attendee replacement instruction, the personal video information indicated by the first attendee identifier in the synthesized video with the personal video information indicated by the second attendee identifier. The communications interface 720 is further configured to send the synthesized video with the replaced personal video information to the third video terminal to display.

In this embodiment, the communications interface 720 is further configured to receive a first attendee replacement instruction sent by the first video terminal, the second video terminal, or the third video terminal, where the second attendee replacement instruction carries a third attendee identifier, and the second attendee replacement instruction is used to instruct to replace the personal video information included in the synthesized video with personal video information indicated by the third attendee identifier, where the personal video information indicated by the third attendee identifier is personal video information included in first video information except the first video information in the synthesized video, or personal video information included in second video information except the second video information in the synthesized video. The processor 710 is further configured to call an instruction and data in the memory 730, to select, according to the second attendee replacement instruction, target personal video information from the personal video information included in the synthesized video, and replace the selected target personal video information with the personal video information indicated by the third attendee identifier. The communications interface 720 is further configured to send the synthesized video with the replaced personal video information to the third video terminal to display.

In this embodiment, the second attendee replacement instruction further carries location information. The processor 710 is further configured to call an instruction and data in the memory 730, to use, according to the second attendee replacement instruction, the personal video information that corresponds to the location information included in the second attendee replacement instruction and is included in the synthesized video as the target personal video information.

In this embodiment, the communications interface 720 is further configured to receive an add instruction from the first video terminal, the second video terminal, or the third video terminal, where the add instruction carries a fourth attendee identifier, and the add instruction is used to instruct to add personal video information indicated by the fourth attendee identifier to the synthesized video, where the personal video information indicated by the fourth attendee identifier is personal video information included in first video information except the first video information in the synthesized video, or personal video information included in second video information except the second video information in the synthesized video. The processor 710 is further configured to call an instruction and data in the memory 730, to add, according to the add instruction, the personal video information indicated by the fourth attendee identifier to the synthesized video. The communications interface 720 is further configured to send the synthesized video with the added personal video information to the third video terminal to display.

In this embodiment, the communications interface 720 is further configured to receive a delete instruction sent by the first video terminal, the second video terminal, or the third video terminal, where the delete instruction carries a fifth attendee identifier, and the delete instruction is used to instruct to delete personal video information indicated by the fifth attendee identifier from the synthesized video, where the personal video information indicated by the fifth attendee identifier is the personal video information included in the synthesized video. The processor 710 is further configured to call an instruction and data in the memory 730, to delete, according to the delete instruction, the personal video information indicated by the fifth attendee identifier from the personal video information included in the synthesized video. The communications interface 720 is further configured to send the synthesized video with the deleted personal video information to the third video terminal to display.

In this embodiment, the processor 710 is further configured to splice corresponding images in the preset quantity of the personal video information to generate a synthesized image, where the corresponding images in the preset quantity of the personal video information are synchronous in time sequence, and combine a plurality of the synthesized images to generate a synthesized video.

In this embodiment, the processor 710 is further configured to arrange image information included in the preset quantity of the personal video information in a preset background image to generate a synthesized image, where the image information included in the preset quantity of the personal video information acquired from the first video information and the second video information is synchronous in time sequence, and combine a plurality of the synthesized images to generate a synthesized video.

Figure 17:
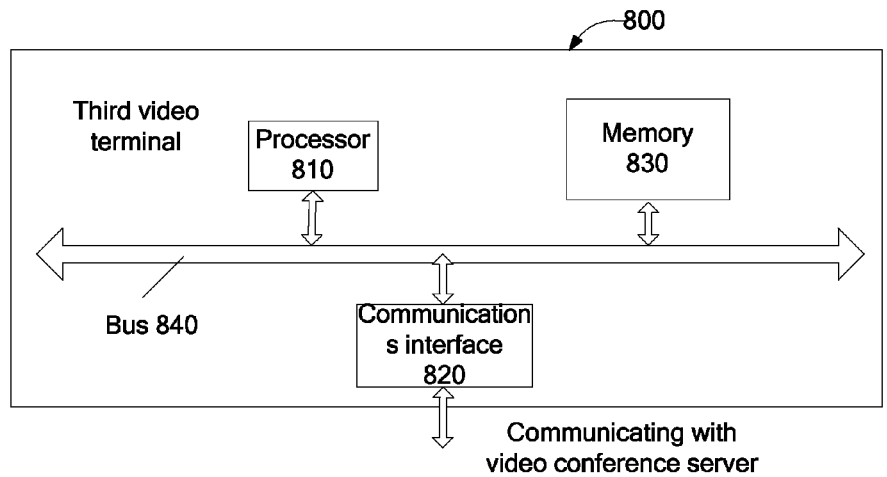
FIG. 17 is a schematic structural diagram of a third type of first video terminal according to an embodiment of the present invention.

FIG. 17 is a schematic structural diagram of a third type of first video terminal according to an embodiment of the present invention. As shown in FIG. 17, a first video terminal 800 provided by this embodiment may perform each step of the method for processing a video conference applied to the video terminal provided by any embodiment of the present invention, and a specific implementation process is not further described herein.

The first video terminal 800 provided by this embodiment includes a processor 810, a communications interface 820, a memory 830, and a bus 840, where the processor 810, the communications interface 820, and the memory 830 are interconnected using the bus 840. The communications interface 820 is configured to receive a synthesized video sent by a video conference server, where the synthesized video is acquired, by the video conference server, by synthesizing a preset quantity of personal video information acquired from the first video information received from the first video terminal and the second video information received from the second video terminal, where attendees separately corresponding to the preset quantity of the personal video information are in a consistent site background in the synthesized video, the first video information includes personal video information of each attendee in a site where the first video terminal is located, and the second video information includes personal video information of each attendee in a site where the second video terminal is located. The memory 830 is configured to store an instruction or data. The processor 810 is configured to call an instruction in the memory 830 to display the synthesized video on the display.

In this embodiment, the communications interface 820 is further configured to receive video information sent by at least one video collection apparatus. The processor 810 is further configured to package received video information as third video information, where each of the at least one video collection apparatus is used to collect video information of at least one attendee in a site where the third video terminal is located, and the third video information includes personal video information of each of the at least one attendee in the site where the third video terminal is located. The communications interface 820 is further configured to send the third video information to the video conference server, so that the video conference server generates, according to the third video information and the first video information, a synthesized video and sends the synthesized video to the second video terminal, or generates, according to the third video information and the second video information, a synthesized video and sends the synthesized video to the first video terminal.

In this embodiment, the processor 810 is further configured to call an instruction and data in the memory 830, to generate, according to switching instruction information entered by a user, a first attendee replacement instruction, where the first attendee replacement instruction carries a first attendee identifier and a second attendee identifier, and the first attendee replacement instruction is used to instruct to replace personal video information indicated by the first attendee identifier in the synthesized video with personal video information indicated by the second attendee identifier, where the personal video information indicated by the first attendee identifier is the personal video information included in the synthesized video, the personal video information indicated by the second attendee identifier is personal video information included in first video information except the first video information in the synthesized video, or personal video information included in second video information except the second video information in the synthesized video. The communications interface 820 is further configured to send the first attendee replacement instruction to the video conference server, so that the video conference server replaces, according to the first attendee replacement instruction, the personal video information indicated by the first attendee identifier in the synthesized video with the personal video information indicated by the second attendee identifier, and receive the synthesized video, that is sent by the video conference server, with the replaced personal video information according to the first attendee replacement instruction and display the synthesized video on the display.

In this embodiment, the processor 810 is further configured to determine a third attendee identifier indicating an attendee who is currently speaking when detecting that a voice collection apparatus in a site where the third video terminal is located has voice input within a preset time range, and generate a second attendee replacement instruction carrying the third attendee identifier, where the second attendee replacement instruction is used to instruct to replace the personal video information included in the synthesized video sent to the first video terminal or the second video terminal with the personal video information indicated by the third attendee identifier. The communications interface 820 is further configured to send the second attendee replacement instruction to the video conference server, so that the video conference server selects, according to the second attendee replacement instruction, target personal video information from the personal video information included in the synthesized video sent to the first video terminal or the second video terminal, and replaces the target personal video information with the personal video information indicated by the third attendee identifier.

In this embodiment, the processor 810 is further configured to call an instruction and data in the memory 830, to generate, according to the received add instruction information entered by a user, an add instruction, where the add instruction carries a fourth attendee identifier, and the add instruction is used to instruct to add personal video information indicated by the fourth attendee identifier to the synthesized video, where the personal video information indicated by the fourth attendee identifier is personal video information included in first video information except the first video information in the synthesized video, or personal video information included in second video information except the second video information in the synthesized video. The communications interface 820 is further configured to send the add instruction to the video conference server, so that the video server adds, according to the add instruction, the personal video information indicated by the fourth attendee identifier to the synthesized video, and receive the synthesized video, that is sent by the video conference server, with the personal video information added according to the add instruction and display the synthesized video on the display.

In this embodiment, the processor 810 is further configured to call an instruction and data in the memory 830, to generate, according to the received deletion instruction information entered by a user, a delete instruction, where the delete instruction carries a fifth attendee identifier, and the delete instruction is used to instruct to delete personal video information indicated by the fifth attendee from the personal video information included in the synthesized video, where the personal video information indicated by the fifth attendee identifier is the personal video information included in the synthesized video. The communications interface 820 is further configured to send the delete instruction to the video conference server, so that the video server deletes, according to the delete instruction, the personal video information indicated by the fifth attendee identifier from the personal video information included in the synthesized video, and receive the synthesized video, that is sent by the video conference server, with the personal video information deleted according to the delete instruction and display the synthesized video on the display.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes any medium that may store program code, such as a read-only memory (ROM), a random access memory (RAM), a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A third video terminal, comprising:
a receiver configured to receive a synthesized video sent by a video conference server, wherein the synthesized video is acquired by the video conference server by synthesizing a preset quantity of personal video information acquired from first video information received from a first video terminal and second video information received from a second video terminal, wherein attendees separately corresponding to the preset quantity of the personal video information are in a consistent site background in the synthesized video, wherein the first video information comprises personal video information of each attendee in a site where the first video terminal is located, and wherein the second video information comprises personal video information of each attendee in a site where the second video terminal is located, wherein the preset quantity of personal video information is synthesized by:
matting a figure of an attendee from a current background image of the first video terminal; and
merging the figure into a preset background image to obtain the synthesized video, and wherein the figure of the attendee is in personal video information from first video information; and
a display connected to the receiver and configured to display the synthesized video.

2. The third video terminal according to claim 1, wherein the receiver is further configured to receive video information sent by at least one video collection apparatus, and wherein the third video terminal further comprises:
a first processor connected to the receiver and configured to package received video information as third video information, wherein each of the at least one video collection apparatus is configured to collect video information of at least one attendee in a site where the third video terminal is located, and wherein the third video information comprises personal video information of each of the at least one attendee in the site where the third video terminal is located; and
a first transmitter connected to the first processor and configured to send the third video information to the video conference server, so that the video conference server generates, according to the third video information and the first video information, a synthesized video and sends the synthesized video to the second video terminal, or generates, according to the third video information and the second video information, a synthesized video and sends the synthesized video to the first video terminal.

3. The third video terminal according to claim 1, further comprising:
a second processor configured to generate, according to switching instruction information entered by a user, a first attendee replacement instruction, wherein the first attendee replacement instruction carries a first attendee identifier and a second attendee identifier, wherein the first attendee replacement instruction is used to instruct to replace personal video information indicated by the first attendee identifier in the synthesized video with personal video information indicated by the second attendee identifier, and wherein the personal video information indicated by the first attendee identifier is the personal video information that is part of the synthesized video, the personal video information indicated by the second attendee identifier is personal video information included in the first video information or in the second video information; and
a second transmitter connected to the second processor and configured to send the first attendee replacement instruction to the video conference server, so that the video conference server replaces, according to the first attendee replacement instruction, wherein the personal video information indicated by the first attendee identifier in the synthesized video with the personal video information indicated by the second attendee identifier, and wherein the receiver is further configured to:

receive the synthesized video, that is sent by the video conference server, with the replaced personal video information according to the first attendee replacement instruction; and display the synthesized video using the display.

4. The third video terminal according to claim 1, further comprising:

a third processor configured to:

determine a third attendee identifier indicating an attendee who is currently speaking when detecting that a voice collection apparatus in a site where the third video terminal is located has voice entered within a preset time range; and generate a second attendee replacement instruction that carries the third attendee identifier, wherein the second attendee replacement instruction is used to instruct to replace the personal video information that is part of the synthesized video sent to one of the first video terminal or the second video terminal with the personal video information indicated by the third attendee identifier; and a third transmitter connected to the third processor and configured to send the second attendee replacement instruction to the video conference server, so that the video conference server selects, according to the second attendee replacement instruction, target personal video information from the personal video information that is part of the synthesized video sent to one of the first video terminal or the second video terminal, and replaces the target personal video information with the personal video information indicated by the third attendee identifier.

5. The third video terminal according to claim 1, further comprising:

a fourth processor configured to generate, according to received add instruction information entered by a user, an add instruction, wherein the add instruction carries a fourth attendee identifier, wherein the add instruction is used to instruct to add personal video information indicated by the fourth attendee identifier to the synthesized video, and wherein the personal video information indicated by the fourth attendee identifier is personal video information included in the first video information or in the second video information; and a fourth transmitter connected to the fourth processor and configured to send the add instruction to the video conference server, so that the video server adds, according to the add instruction, the personal video information indicated by the fourth attendee identifier to the synthesized video, wherein the receiver is further configured to:

receive the synthesized video that is sent by the video conference server with the personal video information added according to the add instruction; and display the synthesized video using the display.

6. The third video terminal according to claim 1, further comprising:

a fifth processor configured to generate, according to received delete instruction information entered by a user, a delete instruction, wherein the delete instruction carries a fifth attendee identifier, wherein the delete instruction is used to instruct to delete personal video information indicated by the fifth attendee from the personal video information that is part of the synthesized video, and wherein the personal video information indicated by the fifth attendee identifier is the personal video information that is part of the synthesized video; and a fifth transmitter connected to the fifth processor and configured to send the delete instruction to the video conference server, so that the video server deletes, according to the delete instruction, the personal video information indicated by the fifth attendee identifier from the personal video information that is part of the synthesized video, wherein the receiver is further configured to:

receive the synthesized video that is sent by the video conference server with the personal video information deleted according to the delete instruction; and display the synthesized video using the display.

7. A third video terminal, comprising:

a bus;

a display;

a communications interface configured to receive a synthesized video sent by a video conference server, wherein the synthesized video is acquired, by the video conference server, by synthesizing a preset quantity of personal video information acquired from the first video information received from the first video terminal and the second video information received from the second video terminal, wherein attendees separately corresponding to the preset quantity of personal video information are in a consistent site background in the synthesized video, the first video information comprises personal video information of each attendee in a site where the first video terminal is located, and wherein the second video information comprises personal video information of each attendee in a site where the second video terminal is located, wherein the preset quantity of personal video information is synthesized by:

separating a figure of an attendee from a current background image of the first video terminal; and merging the figure into a preset background image to obtain the synthesized video, and wherein the figure of the attendee is in personal video information from first video information;

a memory configured to store an instruction and data; and a processor configured to call the instruction in the memory to display the synthesized video on the display, wherein the processor, the communications interface, the memory, and the display are interconnected using the bus.

8. The third video terminal according to claim 7, wherein the communications interface is further configured to receive video information sent by at least one video collection apparatus, wherein the processor is further configured to package received video information as third video information, wherein each of the at least one video collection apparatus is used to collect video information of at least one attendee in a site where the third video terminal is located, wherein the third video information comprises personal video information of each of the at least one attendee in the site where the third video terminal is located, and wherein the communications interface is further configured to send the third video information to the video conference server, so that the video conference server generates, according to the third video information and the first video information, a synthesized video and sends the synthesized video to the second video terminal, or generates, according to the third video information and the second video information, a synthesized video and sends the synthesized video to the first video terminal.

9. The third video terminal according to claim 7, wherein the processor is further configured to call the instruction and the data in the memory, to generate, according to switching instruction information entered by a user, a first attendee replacement instruction, wherein the first attendee replacement instruction carries a first attendee identifier and a second attendee identifier, wherein the first attendee replacement instruction is used to instruct to replace personal video information indicated by the first attendee identifier in the synthesized video with personal video information indicated by the second attendee identifier, wherein the personal video information indicated by the first attendee identifier is the personal video information that is part of the synthesized video, the personal video information indicated by the second attendee identifier is personal video information included in the first video information or in the second video information, and wherein the communications interface is further configured to:

send the first attendee replacement instruction to the video conference server, so that the video conference server replaces, according to the first attendee replacement instruction, the personal video information indicated by the first attendee identifier in the synthesized video with the personal video information indicated by the second attendee identifier; and receive the synthesized video that is sent by the video conference server with the replaced personal video information according to the first attendee replacement instruction and display the synthesized video on the display.

10. The third video terminal according to claim 7, wherein the processor is further configured to:

determine a third attendee identifier indicating an attendee who is currently speaking when detecting that a voice collection apparatus in a site where the third video terminal is located has voice input within a preset time range; and generate a second attendee replacement instruction that carries the third attendee identifier, wherein the second attendee replacement instruction is used to instruct to replace the personal video information that is part of the synthesized video sent to one of the first video terminal or the second video terminal with personal video information indicated by the third attendee identifier, and wherein the communications interface is further configured to send the second attendee replacement instruction to the video conference server, so that the video conference server selects, according to the second attendee replacement instruction, target personal video information from the personal video information that is part of the synthesized video sent to one of the first video terminal or the second video terminal, and replaces the target personal video information with the personal video information indicated by the third attendee identifier.

11. The third video terminal according to claim 7, wherein the processor is further configured to call the instruction and the data in the memory to generate, according to the received add instruction information entered by a user, an add instruction, wherein the add instruction carries a fourth attendee identifier, wherein the add instruction is used to instruct to add personal video information indicated by the fourth attendee identifier to the synthesized video, wherein the personal video information indicated by the fourth attendee identifier is personal video information included in the first video information or in the second video information, and wherein the communications interface is further configured to:

send the add instruction to the video conference server, so that the video server adds, according to the add instruction, the personal video information indicated by the fourth attendee identifier to the synthesized video; and receive the synthesized video that is sent by the video conference server with the personal video information added according to the add instruction and display the synthesized video on the display.

12. The third video terminal according to claim 7, wherein the processor is further configured to call the instruction and the data in the memory, to generate, according to the received deletion instruction information entered by a user, a delete instruction, wherein the delete instruction carries a fifth attendee identifier, wherein the delete instruction is used to instruct to delete personal video information indicated by the fifth attendee from the personal video information that is part of the synthesized video, wherein the personal video information indicated by the fifth attendee identifier is the personal video information that is part of the synthesized video, and wherein the communications interface is further configured to:

send the delete instruction to the video conference server, so that the video server deletes, according to the delete instruction, the personal video information indicated by the fifth attendee identifier from the personal video information that is part of the synthesized video; and receive the synthesized video that is sent by the video conference server with the personal video information deleted according to the delete instruction and display the synthesized video on the display.

13. The third video terminal according to claim 1, wherein the preset background image is the same in the synthesized video and the second video information.

14. The third video terminal according to claim 7, wherein the preset background image is the same in the synthesized video and the second video information.

* * * * *